(12) United States Patent
Ito et al.

(10) Patent No.: US 9,014,483 B2
(45) Date of Patent: Apr. 21, 2015

(54) INFORMATION PROCESSING METHOD AND APPARATUS

(75) Inventors: Yoshinori Ito, Tokyo (JP); Takahisa Yamamoto, Kawasaki (JP); Masami Kato, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 12/873,159

(22) Filed: Aug. 31, 2010

(65) Prior Publication Data

US 2011/0058741 A1 Mar. 10, 2011

(30) Foreign Application Priority Data

Sep. 7, 2009 (JP) ................................. 2009-206453

(51) Int. Cl.
*G06K 9/56* (2006.01)
*G06K 9/62* (2006.01)
*G06K 9/00* (2006.01)
*G06K 9/46* (2006.01)

(52) U.S. Cl.
CPC .......... *G06K 9/6257* (2013.01); *G06K 9/00973* (2013.01); *G06K 9/4614* (2013.01); *G06K 9/4642* (2013.01)

(58) Field of Classification Search
None
See application file for complete search history.

(56) References Cited

U.S. PATENT DOCUMENTS

| | | | |
|---|---|---|---|
| 4,817,171 A * | 3/1989 | Stentiford | ..................... 382/195 |
| 5,508,823 A | 4/1996 | Kiyohara et al. | |
| 7,369,687 B2 | 5/2008 | Kawato et al. | |
| 7,379,568 B2 | 5/2008 | Movellan et al. | |
| 7,699,423 B2 | 4/2010 | Suwa et al. | |
| 2006/0228005 A1 | 10/2006 | Matsugu et al. | |
| 2008/0285849 A1* | 11/2008 | Lu et al. | ........................ 382/166 |
| 2008/0285867 A1* | 11/2008 | Kajiwara | ..................... 382/233 |
| 2009/0157707 A1 | 6/2009 | Ito et al. | |
| 2010/0180189 A1 | 7/2010 | Ito et al. | |
| 2010/0209010 A1 | 8/2010 | Kato et al. | |

FOREIGN PATENT DOCUMENTS

| | | |
|---|---|---|
| JP | 2004-185611 A | 7/2004 |
| JP | 2005-044330 A | 2/2005 |
| JP | 2005-293061 A | 10/2005 |
| JP | WO 2008/146934 | * 12/2008 |

OTHER PUBLICATIONS

Franklin C. Crow, "Summed-Area Tables for Texture Mapping, Computer Graphics", vol. 18, No. 3, pp. 207-212, Jul. 1984.

(Continued)

*Primary Examiner* — Sumati Lefkowitz
*Assistant Examiner* — Jhere Rowland
(74) *Attorney, Agent, or Firm* — Fitzpatrick, Cella, Harper & Scinto

(57) ABSTRACT

Input information of a multidimensional array is divided into a plurality of divided areas, accumulated information is generated by calculating accumulated values at respective element positions of the input information from a corresponding reference location for each of the plurality of divided areas, and the generated accumulated information is held in a memory for each divided area. Calculation using the accumulated information is executed for a predetermined processing range. The input information is divided into the plurality of divided areas so that two neighboring divided areas have an overlapping area, and the overlapping area has a size at least in which the whole processing range fits.

22 Claims, 16 Drawing Sheets

(56) References Cited

OTHER PUBLICATIONS

Paul Viola, et al., "Rapid Object Detection Using a Boosted Cascade of Simple Features", Accepted Conference on Computer Vision and Pattern Recognition, pp. 1-9, 2001.

U.S. Appl. No. 12/901,364, filed Oct. 8, 2010, Applicants: Yoshinori Ito, et al.

U.S. Appl. No. 12/899,387, filed Oct. 6, 2010, Applicants: Masami Kato, et al.

* cited by examiner

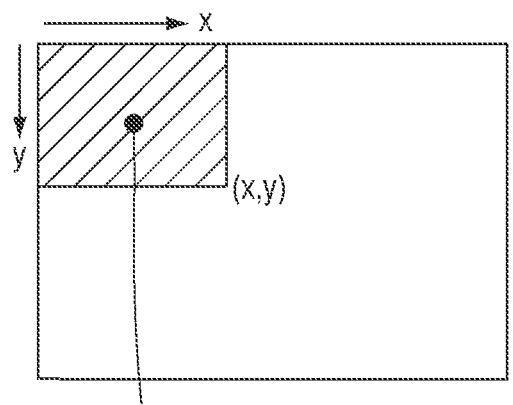
FIG. 4A
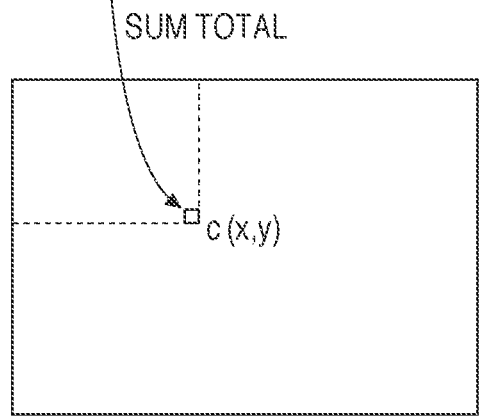
FIG. 4B
FIG. 4C
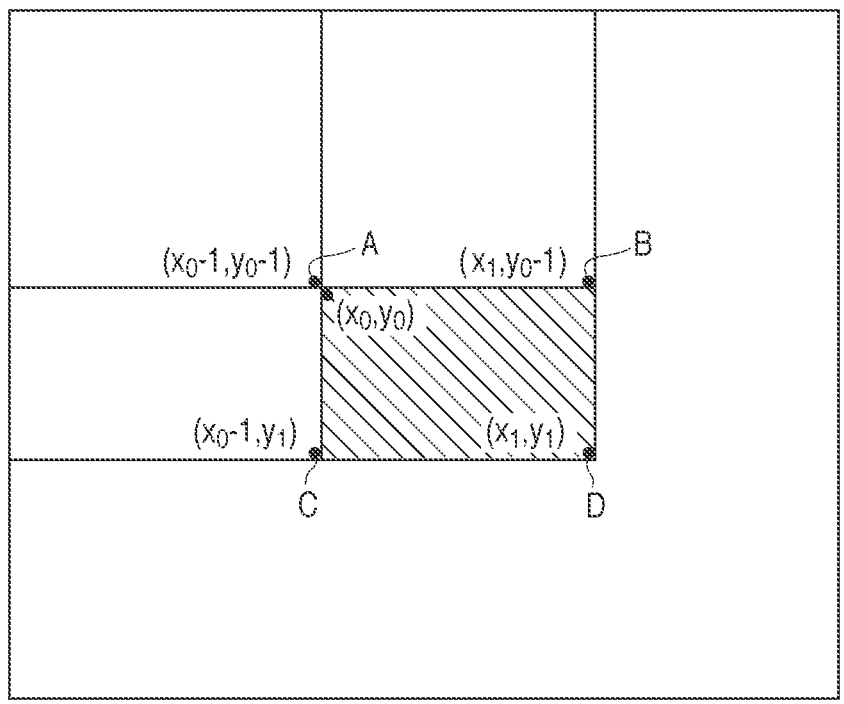

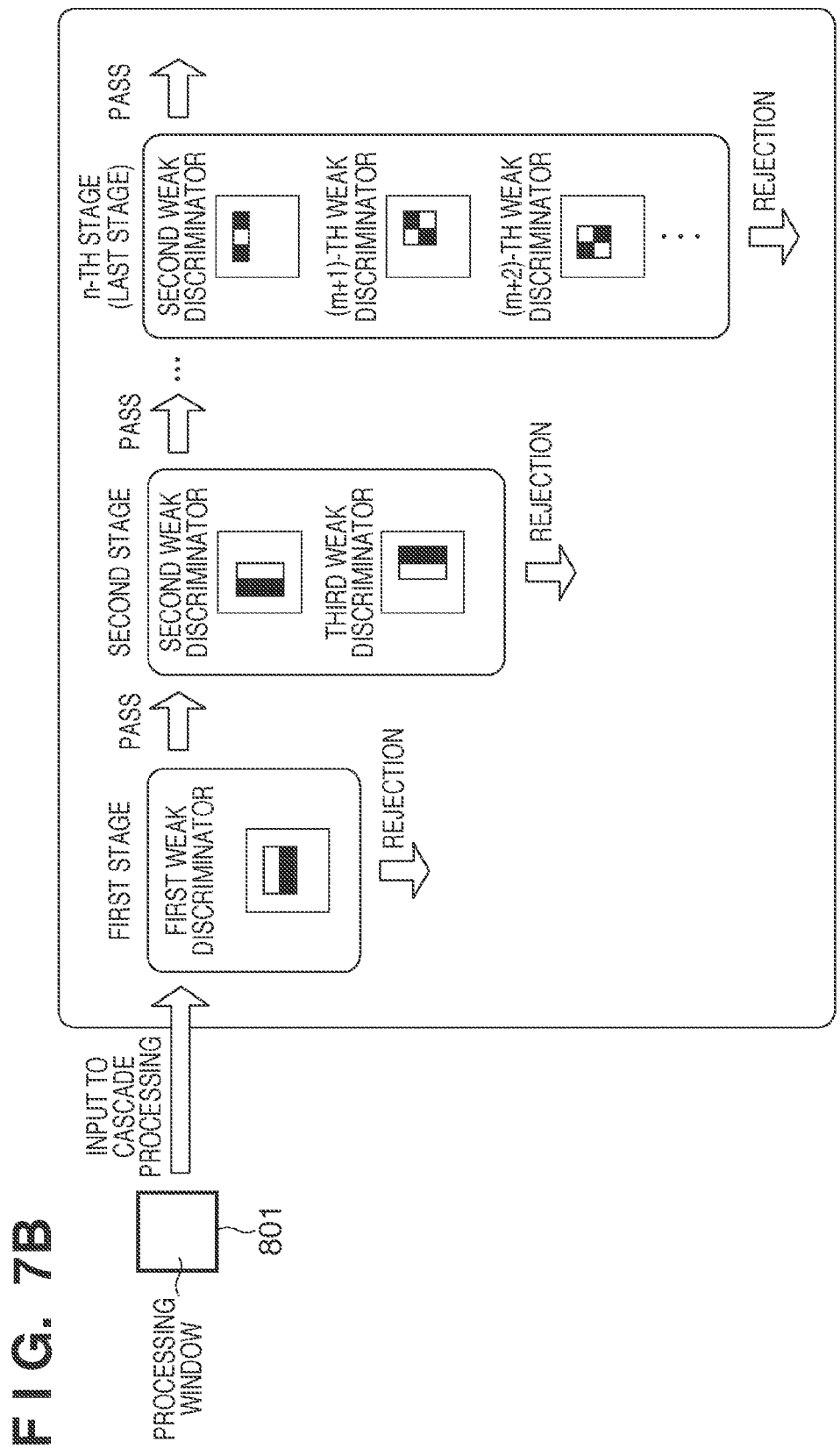

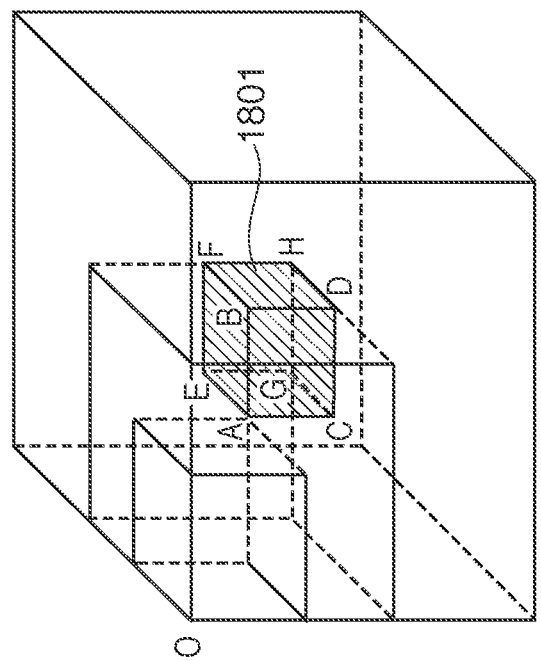
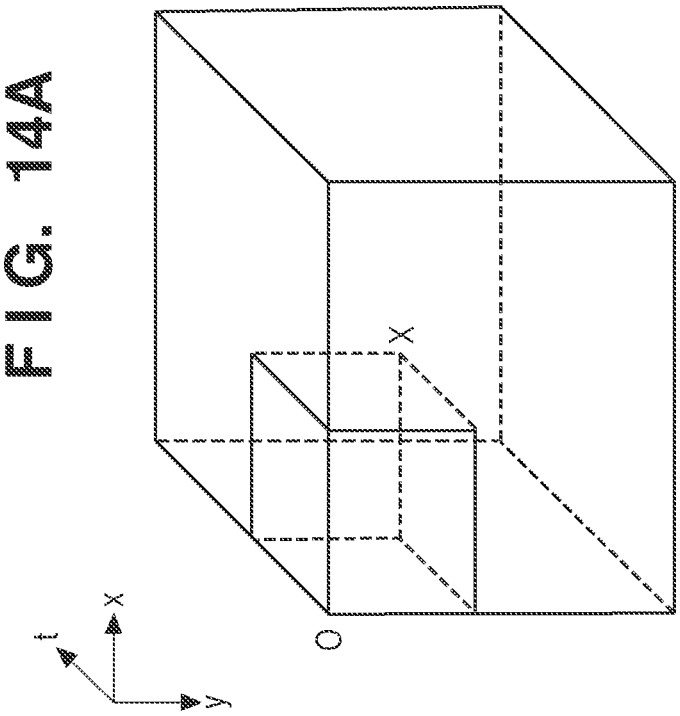

INFORMATION PROCESSING METHOD AND APPARATUS

BACKGROUND OF THE INVENTION

1. Field of the Invention

The present invention relates to an information processing method and apparatus for image processing, image recognition, image composition, information analysis, and the like.

2. Description of the Related Art

The information processing field frequently handles multidimensional array information. In this field, processes associated with image processing, image recognition, image composition, and statistical processing often calculate and use a sum total value of elements within a range of a specific area. For this purpose, as an example of an application used to execute information processing, a spreadsheet application such as Excel™ available from Microsoft has a function of calculating a sum of elements within a designated rectangle in a two-dimensional table. Also, a programming language for calculations such as MATLAB™ available from Mathworks has a function of calculating a sum of elements in a matrix.

In the computer graphics field, F. C. Crow has proposed a concept of accumulated image information called a rectangular summed-area table with respect to source input image information (F. C. Crow, "Summed-Area Tables For Texture Mapping", Computer Graphics, 1984. (to be referred to as Reference 1 hereinafter)). In this Reference 1, a two-dimensional array having the same size (the same number of elements) as an input image is defined as a summed-area table, $I(x, y)$ is defined as a pixel value at a coordinate position $(x, y)$ of the input image, and a component $C(x, y)$ at the same position $(x, y)$ of the summed-area table is defined by:

$$C(x, y) = \sum_{\substack{x' \leq x \\ y' \leq y}} I(x', y') \quad (1)$$

That is, as shown in FIG. 4A, a sum total value of pixels in a rectangle, which has pixels at an origin position (0, 0) and the position $(x, y)$ in the original input image as diagonal points, assumes the value $C(x, y)$ at the position $(x, y)$ in the summed-area table shown in FIG. 4B. Note that the original summed-area table of Reference 1 defines the lower left position of an image as an origin position. However, this specification uses the upper left as the origin of an image in order to maintain consistency with the following description.

According to this definition, a sum of $I(x, y)$ in an arbitrary rectangular area horizontally or vertically allocated on an input image can be calculated by referring to only four points on the summed-area table using the following equation. For example, as shown in FIG. 4C, a sum total $C(x_0, y_0; x_1, y_1)$ of pixel values in a rectangular area having, as diagonal points, $(x_0, y_0)$ and $(x_1, y_1)$ can be calculated by:

$$C(x_0, y_0; x_1, y_1) = C(x_0-1, y_0-1) - C(x_0-1, y_1) - C(x_1, y_0-1) + C(x_1, y_1) \quad (2)$$

In this manner, a sum total of values in an arbitrary rectangular area on an image can be calculated quickly.

In the image recognition field, Viola and Jones use the term "Integral Image" to refer to accumulated image information equivalent to the summed-area table. According to Viola and Jones, by cascading a large number of weak discriminators each including a plurality of rectangular filters using this "Integral Image", high-speed face detection processing is implemented (P. Viola, M. Jones, "Rapid Object Detection using a Boosted Cascade of Simple Features", Proc. IEEE Conf. on Computer Vision and Pattern Recognition, Vol. 1, pp. 511-518, December 2001. (to be referred to as Reference 2 hereinafter)). Also, Japanese Patent Laid-Open Nos. 2004-185611, 2005-044330, and 2005-293061 describe an object detection method based on the idea of Reference 2.

In a pattern identification method described in Reference 2, as shown in FIG. 7A, a processing window 801 as a rectangular area having a specific size is shifted within an image 800 as a processing target. It is then determined whether or not the processing window 801 at each shift destination includes a human face. Face detection processing in the processing window is executed in a plurality of stages, and different combinations of weak discriminators are assigned to respective stages. Each weak discriminator detects a so-called Haar-like feature, and is configured by a combination of rectangular filters. Non-patent Reference 2 implements high-speed pattern identification represented by face detection with this configuration.

Upon generation of the aforementioned accumulated image information called the summed-area table or integral image from input image information, the bit precision of a buffer used for storing the generated information is normally specified based on a worst case value that may be calculated. Then, based on the bit precision, a buffer size (a size of a temporary holding area) is determined. That is, letting $X_{img}$ be the width (the number of pixels in the horizontal direction) of input image information, $Y_{img}$ be the height (the number of pixels in the vertical direction), and $N_{img}$ (bits) ($N_{img}$ is a positive integer) be the bit precision of each pixel, a worst case value $C_{max}$ corresponds to the sum total value of all pixels when all the pixel values assume a maximum value $I_{max}$. That is, $C_{max}$ is given by:

$$C_{max} = \sum_{\substack{0 \leq x < X_{img} \\ 0 \leq y < Y_{img}}} I(x, y) = I_{max} X_{img} Y_{img} \quad (3)$$

Therefore, a 1-element bit precision $N_{buf}$ of a buffer used to store the accumulated image information must be a bit precision $N_{buf\_max}$ that can store $C_{max}$, and assumes a value considerably larger than $N_{img}$ although it depends on an image size. For example, when an 8-bit Grayscale image having a VGA size is used as an input image, $N_{img}=8$, $X_{img}=640$, and $Y_{img}=480$. Therefore, $C_{max}=78336000=4AB5000h$, that is, a buffer having a precision $N_{buf}=N_{buf\_max}=27$ bits must be created. When the accumulated image information for an entire area with respect to input image information must be temporarily held, a memory area such as a RAM as large as $N_{buf\_max} \times X_{img} \times Y_{img}=8294400$ bits must be created, thus limiting processing resources. Hence, the bit precision $N_{buf}$ of the buffer must be reduced by an arbitrary method. In particular, when processing based on such accumulated information is implemented in hardware, a considerable problem is posed since work memory size is directly related to circuit scale. Even in the case of software processing, however, if $N_{buf}$ can be reduced, a smaller buffer can be used, thus reducing resource consumption.

Reference 1 describes one method of reducing the bit precision $N_{buf}$ of the buffer. That is, input information is divided into, for example, blocks of 16×16 pixels, and Summed-area tables are independently calculated for respective blocks. If the input information has a bit precision $N_{img}=8$ bits, the bit precision of the buffer required at this time is 16 bits. In addition, a 32-bit value of an original Summed-area table corresponding to a pixel position which neighbors the upper left end corner of each block in an upper left oblique direction is held. In order to restore a value corresponding to a desired position, a 32-bit value held by a block including that position need only be added to a 16-bit value at that position.

However, these calculations do not suffice to actually restore the value of the original Summed-area table. That is, conventionally, a sum total value of a desired area can be calculated by making simple additions and subtractions given by equation (2) with reference to four points. However, since a calculation required to restore a value of each point is added, the calculation load increases considerably. When this method is implemented by hardware processing, the circuit scale required for calculations increases. Even in the case of implementation by software processing, processing speed is reduced.

SUMMARY OF THE INVENTION

The present invention has been made in consideration of the aforementioned problems, and provides, according to one embodiment of the present invention, an information processing apparatus and information processing method, which can reduce a buffer size required to hold accumulated information without increasing any circuit scale and processing load required for calculations.

According to one aspect of the present invention, there is provided an information processing method comprising: a dividing step of dividing input information of a multidimensional array into a plurality of divided areas; a generating step of generating accumulated information by calculating accumulated values at respective element positions of the input information from a corresponding reference location for each of the plurality of divided areas; a holding step of holding the accumulated information generated in the generating step in a memory; and a calculating step of executing calculation using the accumulated information for a predetermined processing range, wherein in the dividing step, the input information is divided into the plurality of divided areas so that two neighboring divided areas have an overlapping area, and the overlapping area has a size at least in which the whole processing range fits.

Also, according to another aspect of the present invention, there is provided an information processing apparatus comprising: a dividing unit configured to divide input information of a multidimensional array into a plurality of divided areas; a generating unit configured to generate accumulated information by calculating accumulated values at respective element positions of the input information from a corresponding reference location for each of the plurality of divided areas; a holding unit configured to hold the accumulated information generated by the generating unit in a memory for each divided area; and a calculating unit configured to execute calculation using the accumulated information for a predetermined processing range, wherein the dividing unit divides the input information into the plurality of divided areas so that two neighboring divided areas have an overlapping area, and the overlapping area has a size at least in which the whole processing range fits.

Further features of the present invention will become apparent from the following description of exemplary embodiments with reference to the attached drawings.

BRIEF DESCRIPTION OF THE DRAWINGS

FIGS. 4A and 4B are views for explaining a general generation method of accumulated image information with respect to two-dimensional input information;

FIG. 4C is a view for explaining a method of calculating a sum total value of elements in a desired rectangular area using the accumulated image information;

FIG. 7B is a view showing a configuration example of a pattern identifier configured by a plurality of weak discriminators;

FIGS. 14A and 14B are explanatory views of three-dimensional accumulated information as an example of multidimensional accumulated information;

DESCRIPTION OF THE EMBODIMENTS

An embodiment for carrying out the present invention will be described hereinafter using the drawings. Note that in this specification, array information of two or more dimensions such as a Summed-area table or Integral Image described in the related art, which is generated by accumulated additions based on input information of a multidimensional array having the same dimensions, is simply called accumulated information. In particular, when input information is image information of a two-dimensional array, the array information is called accumulated image information. Note that in this embodiment, each element of input information is expressed as a positive integer (or a fixed-point value). Note that when input information is image information, each element indicates a pixel.

First Embodiment (Description of Block Diagram)

Figure 1:
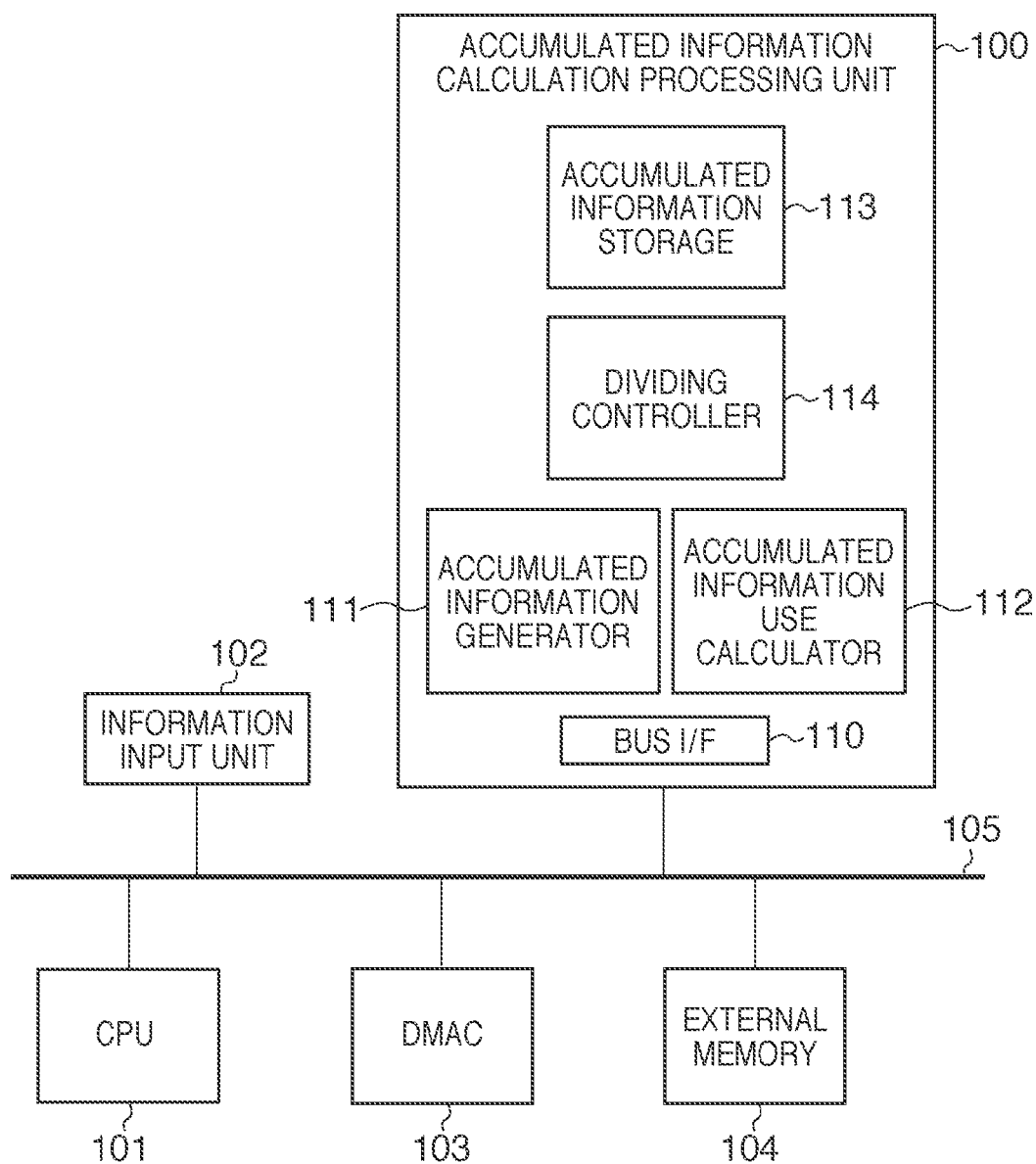
FIG. 1 is a block diagram showing an example of the arrangement of an information processing apparatus according to an embodiment.

FIG. 1 is a block diagram showing the arrangement of an information processing apparatus according to an embodiment of the present invention. A CPU 101 implements desired processing as an object of the information processing apparatus by controlling respective units connected via a bus 105. An information input unit 102 inputs multidimensional input information, for example, input image data to be processed into the apparatus. The information input unit 102 may include, for example, an image sensor such as a CCD, or an I/F device which has a predetermined communication route such as a network, and receives data to be processed from an external apparatus. An external memory 104 includes storage devices such as a ROM, RAM, or HDD, and is connected to the bus 105. The external memory 104 stores program codes required when the CPU 101 operates, and is used as a work area when the CPU 101 executes various processes. Also, the external memory 104 is used as an area for holding input information as needed. A DMA controller 103 (to be abbreviated as a DMAC 103 hereinafter) can autonomously and continuously execute data transfer of a predetermined size among the information input unit 102, the external memory 104, and an accumulated information calculation processing unit 100 (to be described later) when the CPU 101 sets and instructs a data transfer operation. Upon completion of the instructed transfer operation, the DMAC 103 notifies the CPU 101 of an interrupt signal via the bus 105. The accumulated information calculation processing unit 100 includes, in addition to a bus I/F 110 required to be connected to the bus 105, an accumulated information generator 111, accumulated information use calculator 112, accumulated information storage 113, and dividing controller 114.

Figure 6A:
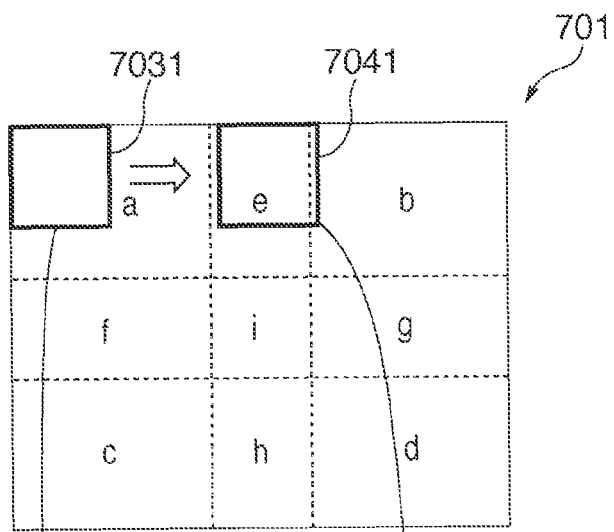
FIGS. 6A and 6B are views showing an example of overlapping divided accumulated information according to the embodiment.
Figure 6B:
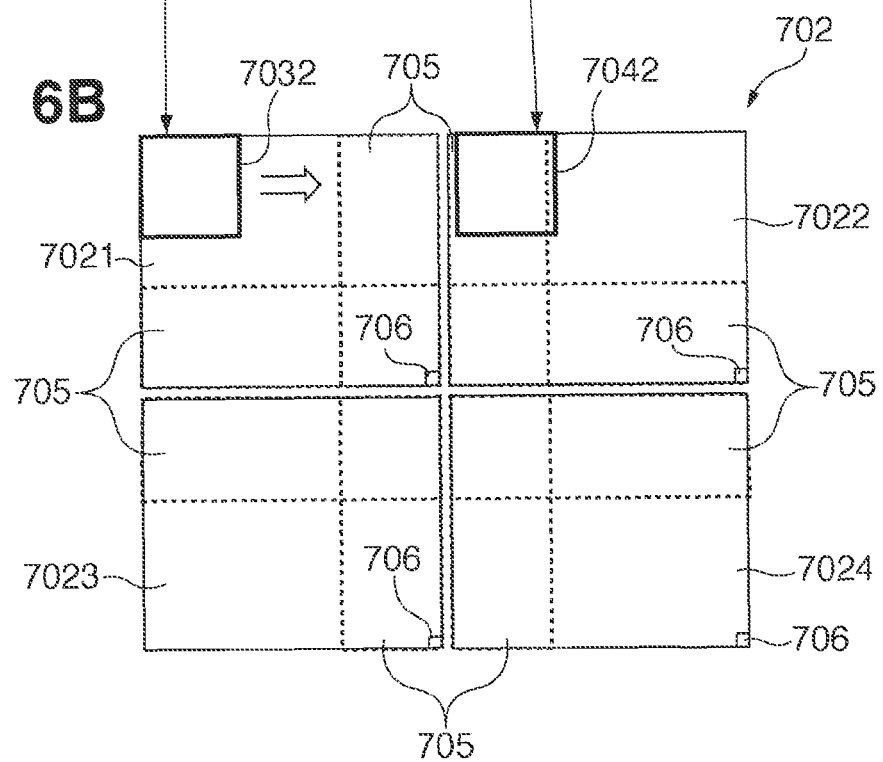

The accumulated information storage 113 includes an accumulated information holding memory of a bit precision $N_{buf}$ required to hold accumulated information, and a memory controller used to control input/output accesses to the memory. Note that the bit precision $N_{buf}$ will be described later. The accumulated information generator 111 generates accumulated information from processing target information such as image data input from the information input unit 102, and stores the generated accumulated information in the accumulated information storage 113. In this case, the accumulated information generator 111 calculates overlapping divided accumulated information in place of simple accumulated information under the control of the dividing controller 114. Note that the overlapping divided accumulated information is accumulated information calculated for each of divided areas having predetermined overlapping areas, which are obtained by dividing a processing target image at boundaries, as shown in FIGS. 6A and 6B, as will be described in detail later. The accumulated information generator 111 generates accumulated information by calculating accumulated values of input information at respective element positions from a reference location of each of a plurality of divided areas. Details of the accumulated information generator 111 will be described later using FIG. 2. The accumulated information use calculator 112 executes calculation processing using the overlapping divided accumulated information held in the accumulated information storage 113 in accordance with a request from the CPU 101, and returns the calculation result to the CPU 101. Details of the accumulated information use calculator 112 will be described later using FIG. 3.

The dividing controller 114 is set in advance with dividing parameters, and divides input information of a multidimensional array into a plurality of divided areas. The dividing parameters specify information indicating types of overlapping areas and the number of areas to be obtained by dividing a processing target image. For example, in this embodiment, assume that the dividing parameters specify to use a size corresponding to a processing window (to be described later) having a size of 16 pixels×16 pixels as an overlapping area at a boundary of divided areas, and to equally divide respective vertical and horizontal directions of dimension into two areas, that is, a total of four areas (see FIGS. 6A and 6B). The dividing parameters have an arbitrary format as long as the format can express the divided states. Note that arbitrary means (for example, CPU 101) sets the dividing parameters in the dividing controller 114.

The dividing controller 114 outputs block area information including overlapping area information according to the dividing parameters to the accumulated information generator 111 and accumulated information use calculator 112. The block area information has an arbitrary format as long as the format can express the states of divided areas with overlapping areas. For example, in case of FIGS. 6A and 6B, the block area information indicates that a first block 7021 is specified by an area obtained by combining areas a, e, f, and i of input information, the areas e and i specify an overlapping area with a second block 7023, and the areas f and i specify an overlapping area with a third block 7023. Also, respective small images obtained by dividing a processing target image to have overlapping areas will be referred to as overlapping divided areas hereinafter. Note that each overlapping area has a size in which a whole processing window used in, for example, subsequent stage processing such as face detection processing (to be described later) can fit.

(Sequence of Processing Including Subsequent Stage Processing)

Figure 9:
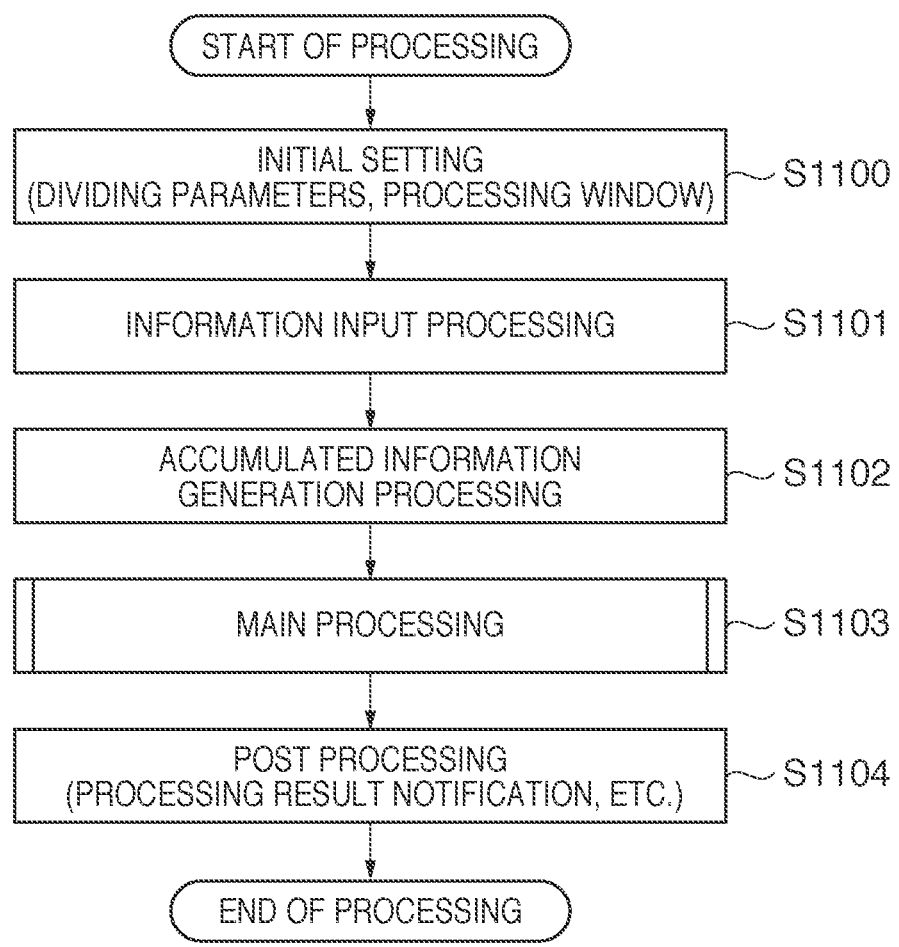
FIG. 9 is a flowchart showing the sequence of overall processing of the information processing apparatus according to a preferred embodiment of the present invention.

The sequence of the overall processing including subsequent stage processing in the information processing apparatus according to this embodiment will be described below. FIG. 9 is a flowchart showing the overall processing by the information processing apparatus according to this embodiment.

In step S1100, the CPU 101 executes initial setting processing of the apparatus including settings for the accumulated information calculation processing unit 100. This processing includes settings of the aforementioned dividing parameters in the dividing controller 114, and a setting for initializing a processing window position in subsequent stage processing to a position including an origin of input information. Then, in response to a user operation or a processing start trigger from an external apparatus (not shown), the CPU 101 executes information input processing S1101. In this processing, input information is received by the information input unit 102, and is stored in the external memory 104 as needed. The following description of this embodiment will be given under the assumption that input information of a multidimensional array is image data expressed as a two-dimensional array having a predetermined size. However, according to the gist of the present invention, multidimensional array information of three or more dimensions may be input information.

In step S1102, the accumulated information calculation processing unit 100 executes accumulated information generation processing using the input information stored in the external memory 104. In this embodiment, this processing generates overlapping divided accumulated information. As will be described in detail later, accumulated information for each divided area is generated based on the input information, and is held in the accumulated information storage 113 for each divided area. The CPU 101 sets the DMAC 103 to sequentially transfer input information element values from the external memory 104 to the accumulated information calculation processing unit 100. In this case, the CPU 101 may parallelly process steps S1101 and S1102 in synchronism with progress information of step S1102. That is, the CPU 101 may repeat steps S1101 and S1102 every time one line is input or may execute continuous processing in a pipeline manner every time one element is input. At this time, if the input information itself is not used in, for example, the subsequent stage processing, the CPU 101 may set the DMAC 103 to directly perform automatic sequential transfer of elements of input information from the information input unit 102 to the accumulated information calculation processing unit 100.

After the pieces of accumulated information are generated in the accumulated information storage 113, the CPU 101 executes main processing that executes calculation processing using these pieces of accumulated information in step S1103. Assume that the information processing apparatus of this embodiment executes pattern identification processing (face detection) described in Reference 2 as the main processing. However, another processing using the accumulated information may be applied, as a matter of course. After completion of the main processing (S1103) such as the pattern identification processing, the CPU 101 executes step S1104 as desired subsequent stage processing. This step may notify, for example, an external apparatus or the user of the processing result, that is, various other processes using a recognition result may be executed. Note that the subsequent stage processing described in this specification includes the main processing in step S1103 and subsequent processing using the accumulated information.

(Pattern Identification Processing in Step S1103)

Figure 7A:
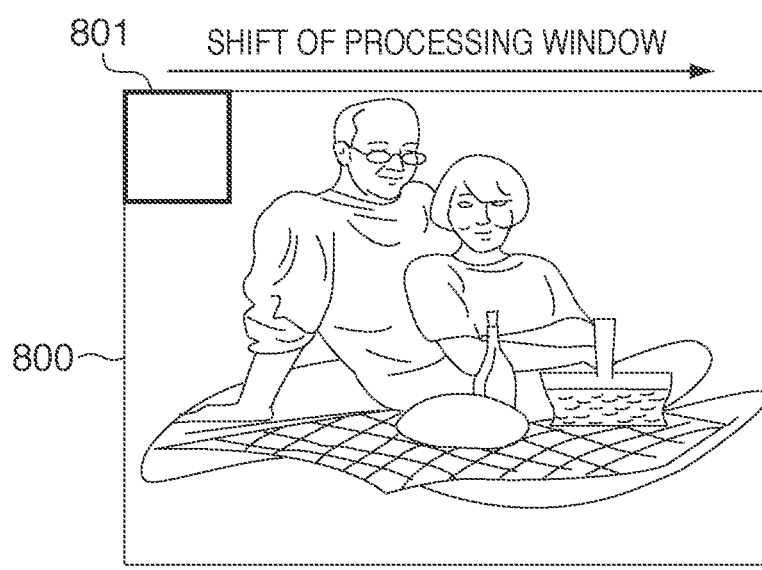
FIG. 7A is a view for explaining face detection processing as an example of pattern recognition processing.

In the pattern identification processing of this embodiment, a processing range indicated by a rectangular area 801 having a specific size (to be referred to as a "processing window" hereinafter) is shifted within an image 800 as a processing target, as shown in FIG. 7A. Then, it is determined whether or not the processing window 801 at shift destinations includes a human face. FIG. 7B is a view showing the sequence of face detection processing executed within the processing window 801 at respective shift destination positions. The face detection processing within the processing window is executed in a plurality of stages, and different combinations of weak discriminators are assigned to the respective stages. Each weak discriminator detects a so-called Haar-like feature, and is configured by a combination of rectangular filters. As shown in FIG. 7B, weak discriminators of different numbers are assigned to the respective stages. To each stage, an order to execute determination is assigned, and the respective stages execute processing according to that order. For example, in FIG. 7B, the second stage executes determination after the first stage, and the third stage then executes determination.

Each stage determines whether or not the processing window includes a human face using weak discriminators having patterns assigned to itself in the order assigned to itself. If a certain stage determines that the processing window does not include any human face, the stages in the subsequent order do not execute any determination for the processing window at that position (cascade processing is aborted). When the stage in the last order determines that the processing window includes a human face, it is determined that the processing window at this shift destination includes a human face.

Figure 8:
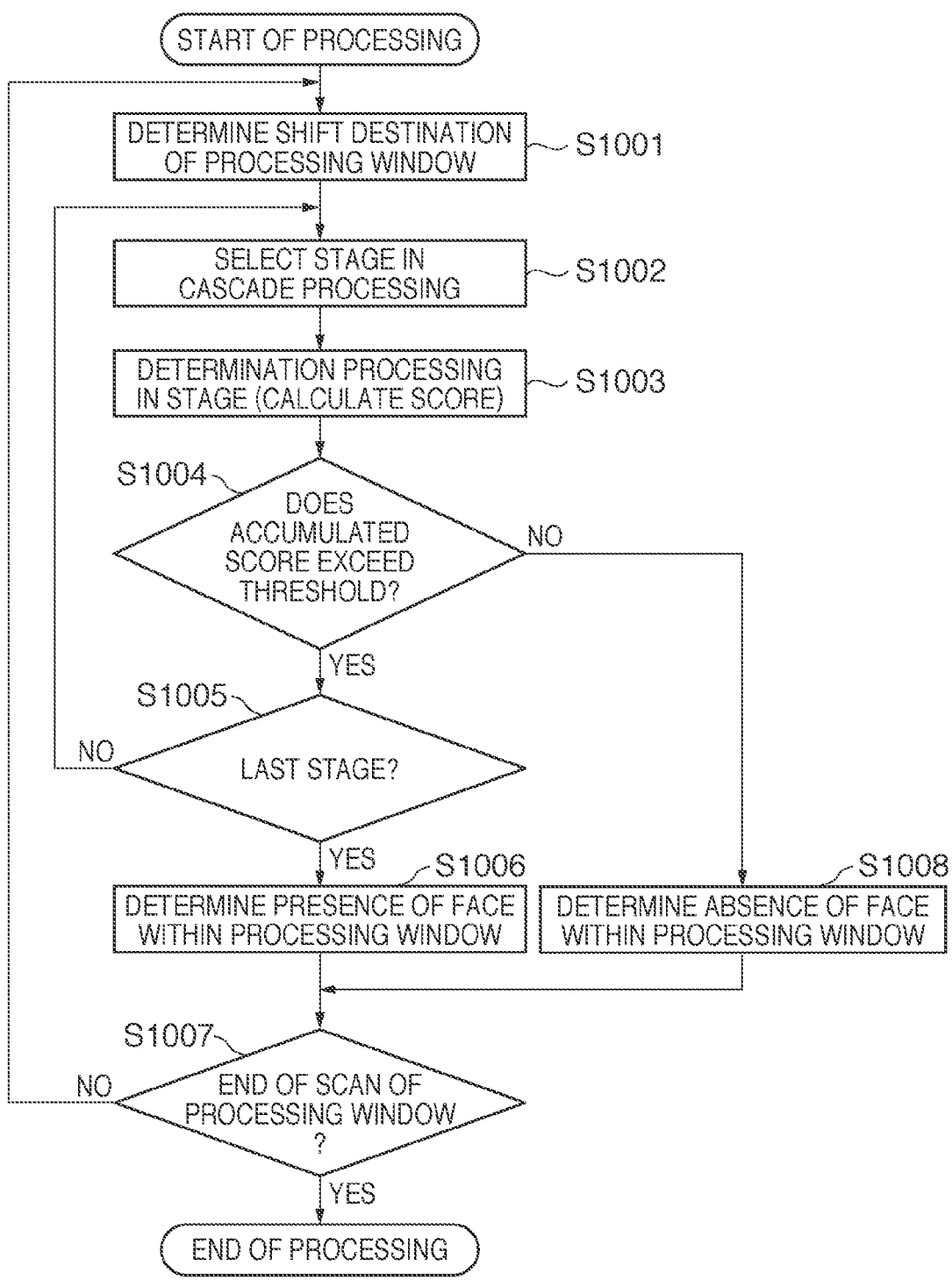
FIG. 8 is a flowchart showing detection processing in the pattern identifier configured by the plurality of weak discriminators.

FIG. 8 is a flowchart showing the sequence of face detection processing. A practical sequence of the face detection processing will be described below using FIG. 8. In the face detection processing, the CPU 101 allocates the processing window 801 as a processing target on the face detection target image 800 (S1001). Basically, this processing window is selected while being shifted exhaustively in turn by scanning from an end of the face detection target image 800 in the vertical and horizontal directions at given intervals, as shown in FIG. 7A. For example, the processing window is selected by raster-scanning the face detection target image 800. Next, the CPU 101 determines whether or not the selected processing window includes a human face. This determination processing is executed using a plurality of stages, as described above using FIG. 7B. For this reason, the plurality of stages are selected in turn from the first stage (S1002).

The selected stage executes the determination processing (S1003). In this determination processing of the stage, if an accumulated score (to be described in detail later) does not exceed a threshold determined in advance for each stage (NO in step S1004), it is determined that the processing window does not include any human face (S1008), and processes in step S1007 and subsequent steps are executed. The processes in step S1007 and subsequent steps will be described later. On the other hand, if the accumulated score (to be described in detail later) exceeds the threshold determined in advance for each stage (YES in step S1004), it is determined whether or not the determination processing (that in step S1003) is that performed by the last stage. If the determination processing is not that performed by the last stage (NO in step S1005), the process returns to step S1002 to select the next stage, and the determination processing is executed by the newly selected stage. On the other hand, if the determination processing is that performed by the last stage (YES in step S1005), it is finally determined that the current processing window includes a human face (S1006). At this time, it is determined that this processing window includes a human face.

Next, it is determined whether or not the processing window as a determination target is the last processing window in the face detection target image. If the target processing window is not the last processing window (NO in step S1007), the process returns to step S1001 to select the next processing window, and the processes in step S1002 and subsequent steps are executed. On the other hand, if the target processing window is the last processing window, the face detection processing for this input image as the face detection target ends.

The determination processing contents in each stage will be described below. One or more weak discriminators of different patterns are assigned to the respective stages. This assignment is executed by a boosting learning algorithm such as AdaBoost in a learning process. Each stage determines based on the weak discriminators of the patterns assigned to itself whether or not the processing window includes a face. In each stage, feature amounts in a plurality of rectangular areas in the processing window are respectively calculated based on the weak discriminators of the patterns assigned to that stage. Feature amounts used in this case are totals, averages, and the like of pixel values in the rectangular areas, that is, values calculated using totals of pixel values in the rectangular areas. The sum total value in each rectangular area can be calculated at high speed using accumulated image information (Summed-area table or Integral Image) for an input image, as described above using FIG. 4C. Then, in this embodiment, this accumulated image information is obtained from the accumulated information calculation processing unit 100 at high speed.

Next, in association with the calculated feature amounts, a difference value as a relative value (for example, a ratio or difference value; in this case, assume that a difference value of feature amounts is calculated) is calculated, and whether or not the processing window includes a human face is determined based on this difference value. More specifically, it is determined whether the calculated difference value is larger or smaller than a threshold set for each weak discriminator of the pattern used in determination. Then, according to this determination result, the presence/absence of a human face in the processing window is determined. However, the determination processing at this time is that based on each weak discriminator of a given pattern but not by the stage. In this manner, in each stage, the determination processing is individually executed based on all the assigned weak discriminators of the patterns, and their determination results are obtained.

Then, an accumulated score in each stage is calculated. An individual score is assigned to each weak discriminator of a given pattern. If it is determined that the processing window includes a human face, a score assigned to the weak discriminator of the pattern used at that time is referred to, and is added to an accumulated score of the stage. A total of the scores added in this way is calculated as an accumulated score of the stage. When the accumulated score of the stage exceeds a specific threshold (accumulated score threshold), this stage determines that the processing window is likely to include a human face, and the processing shifts to the next stage. On the other hand, when the accumulated score in this stage does not exceed the accumulated score threshold, this stage determines that the processing window does not include any human face, and the cascade processing is aborted. With the above sequence, high-speed pattern identification represented by face detection is implemented. Note that a detector shown in FIGS. 7B and 8 can also be used as a pattern identifier for objects other than faces if it has undergone an appropriate learning process.

Note that since the pattern identification processing shown in FIG. 8 detects a predetermined Haar-like feature by each weak discriminator in the determination processing in step S1003, as described above, a sum total value of elements in each rectangular area must be obtained. The CPU 101 activates the accumulated information use calculator 112 to obtain this sum total value at high speed. The operation of the accumulated information use calculator 112 will be described in detail later. The respective units of the accumulated information calculation processing unit 100 will be described in detail below.

(Description of Operation of Accumulated Information Generator 111)

The arrangement and operation of the accumulated information generator 111 will be described below.

In the present invention, the calculation sequence of accumulated information is not particularly limited. However, assume that the accumulated information generator 111 of this embodiment calculates the accumulated information in the sequence described in Reference 1 (Reference 2 also describes the same sequence). That is, letting I(x, y) be a pixel value of an input image, C(x, y) be accumulated information, and S(x, y) be an accumulated value of pixel values in the horizontal direction at a certain coordinate y in the vertical direction, the accumulated information is sequentially calculated by:

$$S(x,y)=S(x-1,y)+I(x,y)$$

$$C(x,y)=C(x,y-1)+S(x,y) \qquad (4)$$

wherein a coordinate starts from 0 (an origin is an upper left end of an image), and S(0, y)=I(0, y) and C(x, 0)=S(x, 0) (that is, S(−1, y)=C(x, −1)=0).

The accumulated information generator 111 of this embodiment calculates divided area accumulated information in the sequence given by equations (4) with reference to an upper left end position corresponding to an origin position of each individual block upon calculating the accumulated information of each block. For example, in a first block 7021 in FIGS. 6A and 6B, pieces of accumulated information continuous in areas a, e, f, and i are calculated by equations (4) on an x-y coordinate system considering an upper left end (i.e., the origin position of input information) of the area a as an origin. In a second block 7022, pieces of accumulated information continuous in areas e, b, i, and g are generated by equations (4) using variable areas different from those of the first block 7021 on an x-y coordinate system considering an upper left end of the area e as an origin. Likewise, pieces of accumulated information corresponding to respective areas are generated using x-y coordinate systems respectively having an upper left end of the area f in a third block 7023 and that of the area i in a fourth block 7024. The origin position used in calculations of accumulated values in each divided area (block) will be referred to as a reference location. In order to calculate overlapping divided accumulated information in this way, horizontal accumulated values (S) and accumulated information values (C) with reference to different positions have to be used, and block area information received from the dividing controller 114 is used to discriminate these positions.

Figure 2:
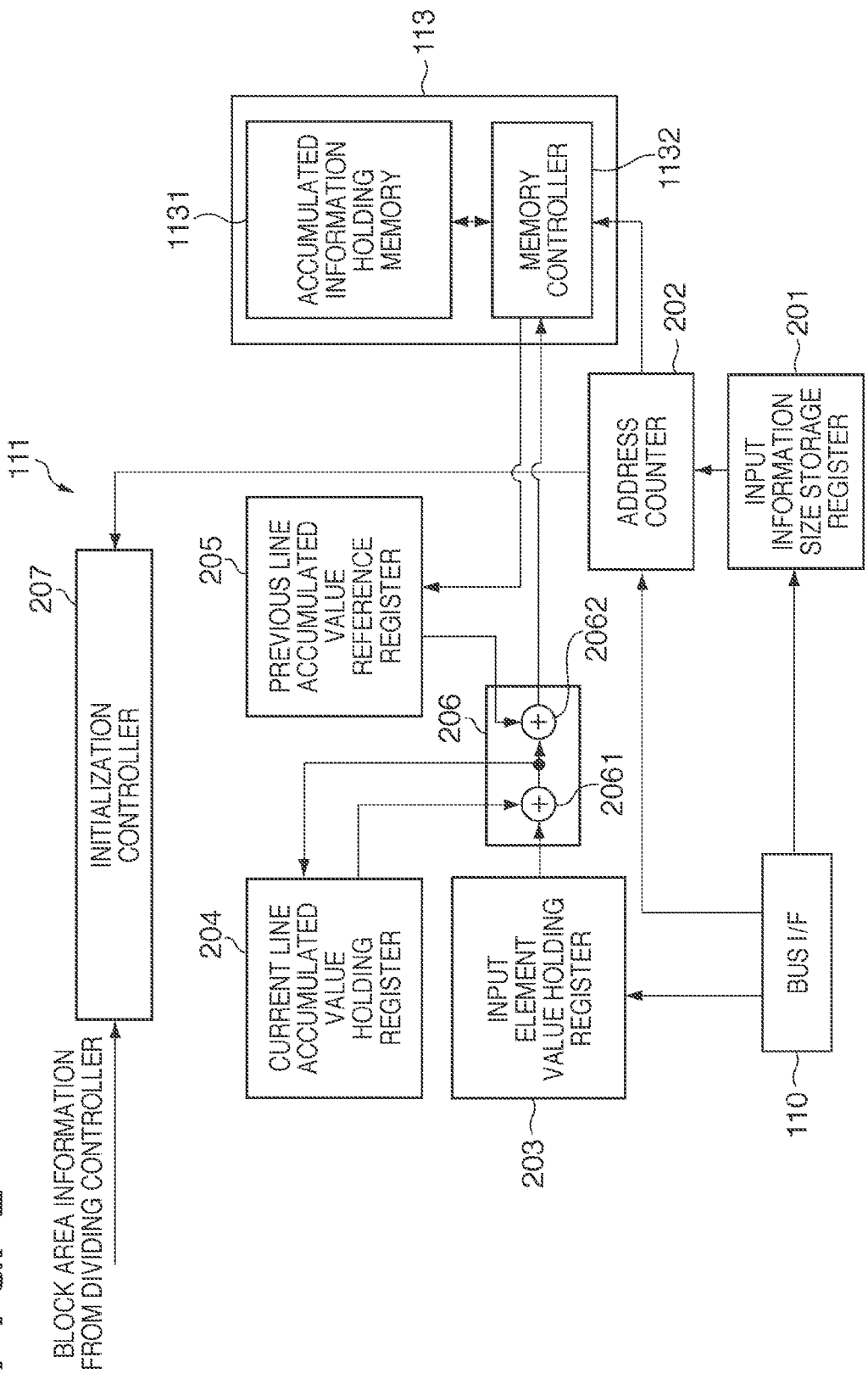
FIG. 2 is a block diagram showing an example of the arrangement of an accumulated information generator of the information processing apparatus according to the embodiment.

FIG. 2 is a block diagram showing the arrangement of the accumulated information generator 111 which generates accumulated information by the aforementioned calculations, and a connection state with the bus I/F 110 and accumulated information storage 113. An input information size storage register 201 stores multidimensional array information (two-dimensional image information in this embodiment) input by the information input unit 102. The input information size storage register 201 is set with the above size value by the CPU 101 via the bus I/F 110 before the beginning of the processing. An input element value holding register 203 sequentially and temporarily holds one element value (a pixel value in this embodiment) of the input array information input via the bus I/F 110 under the control of the CPU 101 or DMAC 103. In this embodiment, assume that image information is sent pixel by pixel from the information input unit 102 or external memory 104 to the accumulated information calculation processing unit 100 in a raster-scan order, and is held in the input element value holding register 203.

An address counter 202 calculates a memory address required to store a corresponding accumulated information value to be generated every time an element value is input to the input element value holding register, based on the size of the input array information stored in the input information size storage register 201. The memory address to be calculated is that of an accumulated information holding memory 1131 in the accumulated information storage 113. When a first pixel (origin position) of the input information is input, the address counter 202 resets an address to be stored to "0" or a predetermined offset value, and stores the coordinates of the current input pixel as an origin (0, 0). Then, address counter 202 increments an x-axis coordinate every time a subsequent pixel is input, resets the x-axis coordinate to "0" when it reaches a size in the x-axis direction stored in the input information size storage register 201, and then increments a y-axis coordinate. The address counter 202 calculates current input pixel coordinates by repeating such operations until the last pixel of the input information is input. Then, the address counter 202 refers to block area information sent from the dividing controller 114, and discriminates, for example, to which of areas a to h shown in FIG. 6A an input pixel belongs, based on the held current input pixel coordinate value. A block for which accumulated information corresponding to each area is to be generated can be discriminated from the block area information. The address counter 202 calculates area addresses of the accumulated information holding memory 1131 assigned to the corresponding block. At this time, in case of a pixel of an overlapping area, since there are plurality of corresponding blocks, the address counter 202 calculates corresponding storage destination addresses.

The input pixel coordinate value calculated by the address counter 202 is output to an initialization controller 207. Furthermore, when it is determined that an input pixel belongs to the second or subsequent line of each block, the address counter 202 calculates a storage address of accumulated information at the same column position one line before (corresponding to $C(x, y-1)$ in equations (4)) in that block. In this embodiment, since accumulated information of each block is held in a continuous address area of the accumulated information holding memory 1131, this address can be obtained by subtracting the number of elements of one line of that block from the previously calculated address. Conversely, when this subtraction result assumes a negative value (or a value smaller than an offset), it can be discriminated that an element value of the first line is still input in this block. The address calculated by the address counter 202 is supplied to a memory controller 1132 to execute a write or read access to that address on the accumulated information holding memory 1131.

A previous line accumulated information value reference register 205 temporarily holds an accumulated information value read out from the accumulated information holding memory 1131 using an accumulated information address in an immediately preceding line for each block, which is calculated by the address counter 202. However, when the initialization controller 207 outputs an initialization instruction, "0" is set in the previous line accumulated information value reference register 205 irrespective of the accumulated information value read out from the accumulated information holding memory 1131. A current line accumulated value holding register 204 holds an accumulative added information value (a value corresponding to $S(x-1, y)$ in equations (4)) from a start pixel (left end) of a block area for one line in that block corresponding to the currently input pixel. At the input timing of a pixel to the input element value holding register 203, an accumulative added value of pixels until the previous processing is held. This register value is held only for one line in each block area corresponding to the currently input pixel. Therefore, when the next line starts in a block, the current line accumulated value holding register 204 is set to be "0" in response to an initialization instruction from the initialization controller 207. Note that in this embodiment, the current line accumulated value holding register 204 and previous line accumulated information value reference register 205 can simultaneously hold values corresponding to a plurality of divided blocks with overlapping areas.

The initialization controller 207 issues an initialization instruction of a value corresponding to each block to the current line accumulated value holding register 204 and previous line accumulated information value reference register 205 using the block area information sent from the dividing controller 114. This is because the accumulated information calculation processing unit 100 calculates pieces of accumulated information (overlapping divided accumulated information) calculated by changing reference locations for respective blocks in place of one continuous accumulated information generated with reference to the origin. That is, $S(-1, y)$ and $C(x, -1)$ are set to be "0" upon calculating accumulated information using equations (4), and the same setting as this is required to be made for each block. When an input pixel belongs to an upper end line of each block, the initialization controller 207 instructs the previous line accumulated information value reference register 205 to initialize an area that holds values for that block, that is, to set "0". Also, when an input pixel belongs to a left end column of each block, the initialization controller 207 instructs the current line accumulated value holding register 204 to initialize an area that holds values for that block, that is, to set "0". Of course, the initialization controller 207 does not initialize areas that hold values for blocks which do not satisfy these conditions.

An accumulative addition processor 206 includes adders 2061 and 2062. The adders 2061 and 2062 have a bit precision=$N_{buf}$ ($N_{buf}$ is a positive integer) for both inputs and outputs. The adder 2061 assumes an addition of the upper equation in equations (4), and the adder 2062 assumes an addition of the lower equation in equations (4). The adder 2061 adds an accumulated value of the current line (a horizontal accumulated value in this example) and an input pixel value. The sum is fed back to and stored in the current line accumulated value holding register 204 as a new horizontal accumulated value, and is used when the next pixel is input. The adder 2062 adds the output from the adder 2061 and an accumulated information value held in the previous line accumulated information value reference register 205. This sum is used as an overlapping divided accumulated information value corresponding to the input pixel position, and is stored at a storage address of the accumulated information holding memory 1131, which is calculated by the aforementioned address counter 202, via the memory controller 1132.

Note that the generation calculations of accumulated information values corresponding to an overlapping area in this embodiment are implemented by time-serially using the accumulative addition processor 206 in turn. Of course, in accordance with a block for which accumulated information values to be generated are held, values to be held in the previous line accumulated information value reference register 205 and current line accumulated value holding register 204 and storage destination addresses generated by the address counter 202 are switched.

Note that, for example, the previous line accumulated information value reference register 205, current line accumulated value holding register 204, and address counter 202 may be implemented by independent dedicated hardware components for respective blocks. Then, input processing of an input pixel value to the input element value holding register 203 and calculation processing of accumulated information values of respective blocks can be simultaneously executed as pipeline processing, thus speeding up the accumulated information generation processing.

(Description of Accumulated Information Use Calculator)

The arrangement and operation of the accumulated information use calculator 112 used in the main processing S1103 will be described below.

In this embodiment, the pattern identification processing described using FIGS. 7A, 7B, and 8 is executed as the main processing (subsequent stage processing) using the calculation result that uses the accumulated information. Therefore, the required calculation result is a sum total value of elements in respective rectangles of weak discriminators which are relatively allocated within the processing window 801 and detect Haar-like features. A sum total value of elements in an arbitrary rectangular area in an input image can be calculated by referring to element values at four points of accumulated image information, as described above using FIG. 4C.

Figure 3:
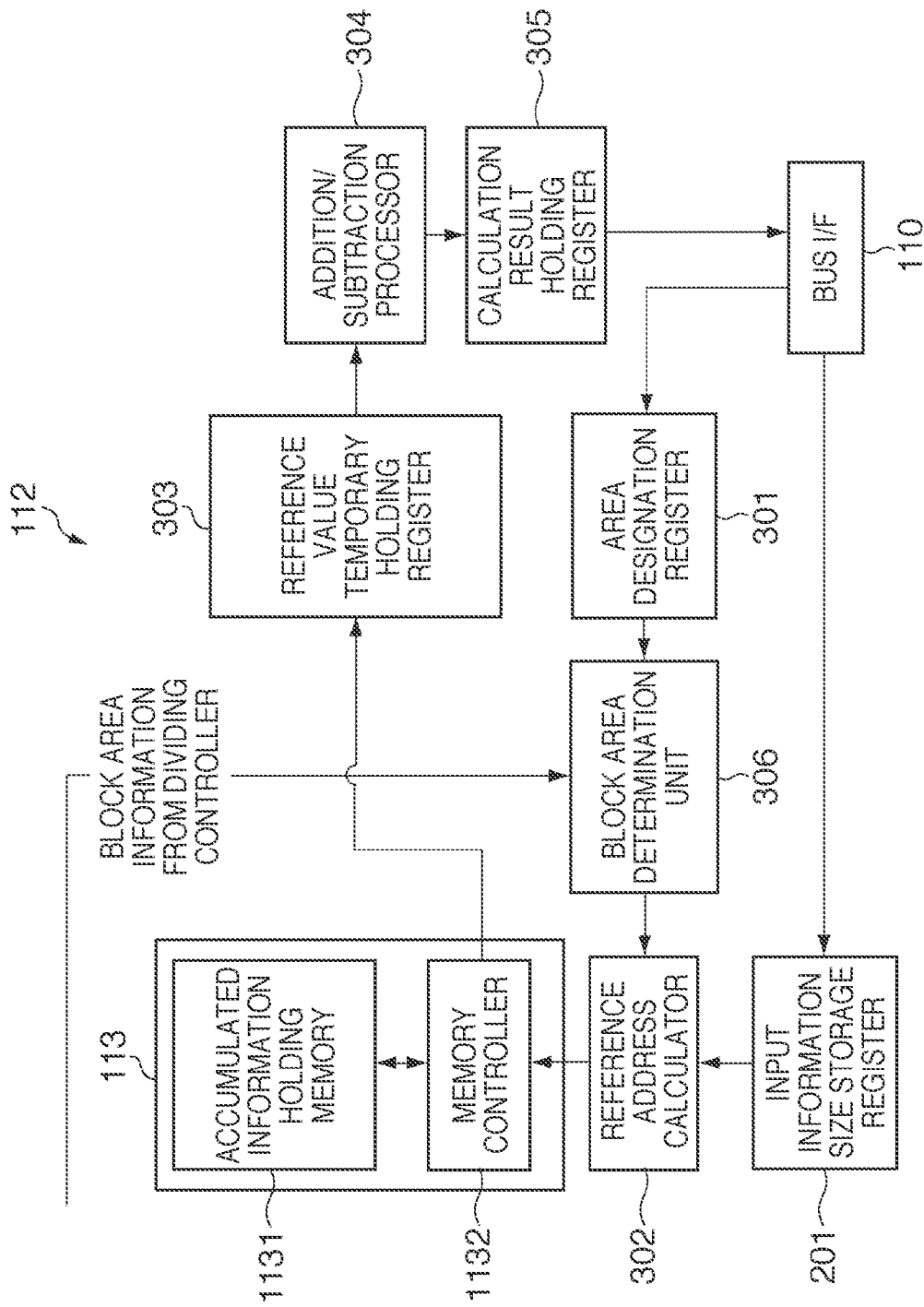
FIG. 3 is a block diagram showing an example of the arrangement of an accumulated information use calculator of the information processing apparatus according to the embodiment.

FIG. 3 is a block diagram showing the arrangement of the accumulated information use calculator 112 and a connection state with the bus I/F 110 and accumulated information storage 113. The input information size storage register 201 is the same as that described in FIG. 2, and is set in advance with a size of input information by the CPU 101 via the bus I/F 110 prior to generation of accumulated information, as described above.

The CPU 101 initially specifies a specific area (rectangular area) for which a sum total value is calculated in the processing window. The CPU 101 then converts diagonal coordinates (relative coordinates) of two points within the processing window, which represent the specified rectangular area, into absolute coordinates from the origin of the input information, that is, $(x_0, y_0)$ and $(x_1, y_1)$ in FIG. 4C. The CPU 101 sets these absolute coordinate values in an area designation register 301 via the bus I/F 110. A block determination processor (or block area determination unit) 306 executes processing for selecting a block which completely includes the specific area designated by the area designation register 301 based on block area information sent from the dividing controller 114. Note that this block selection processing may adopt a method of selecting a block based on a processing window position notified by the CPU 101. As another implementation, the CPU 101 may select a block to be used, and may notify the block determination processor 306 of the selection result.

A reference address calculator 302 refers to the block area information sent from the dividing controller 114, a selected block number indicating a block selected by the block determination processor 306, and values set in the area designation register 301. Then, the reference address calculator 302 calculates an address of the accumulated information holding memory 1131 which stores the accumulated information value of the block that stores values of the designated specific area (e.g., positions of four points A, B, C, and D in FIG. 4C). The reference address calculator 302 passes this address value to the memory controller 1132 in turn. The memory controller 1132 accesses the accumulated information holding memory 1131 based on the received address, and stores the sequentially obtained accumulated information values of the four points in a reference value temporary holding register 303.

After the accumulated information values of the four points are held in the reference value temporary holding register 303, an addition/subtraction processor 304 executes predetermined addition/subtraction processing using the values of the four points. The predetermined addition/subtraction processing makes calculations given by equation (2). This calculation result is held in a calculation result holding register 305. The CPU 101 can detect completion of calculations by, for example, an interrupt notification via the bus I/F 110 or by referring to a completion flag. Then, the CPU 101 obtains the value of the calculation result holding register 305, and uses it as a sum total value of the set rectangular area. Note that all adders and subtractors used in the addition/subtraction processor 304 input and output $N_{buf}$-bit positive values.

(Effects of Bit Reduction/Simplified Calculation According to this Embodiment)

In order to understand the bit reduction effect and simplified calculation effect according to this embodiment well, a method of reducing the bit precision of a buffer, which holds accumulated information, by block division without any overlapping areas, as described in Reference 1, will be described below. Note that since only calculations specified in Reference 1 do not suffice to restore an original non-divided accumulated information value, as described above, a method that improves this point will be described below using FIGS. 5A and 5B.

Figure 5A:
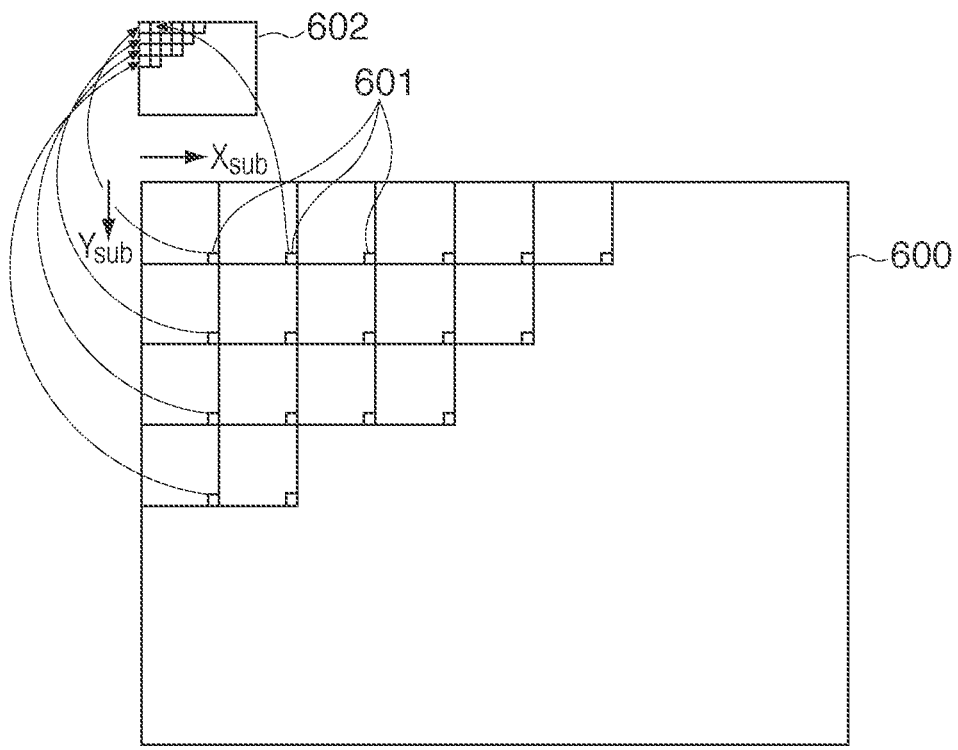
FIGS. 5A and 5B are views for explaining an example of a technique for reducing the bit precision of a buffer used to hold accumulated information.
Figure 5B:
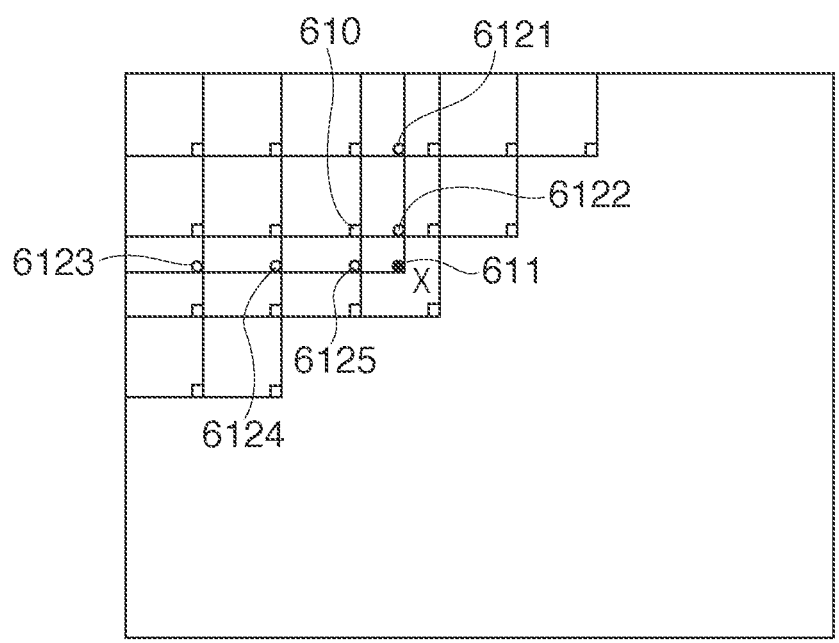

FIG. 5A is a view for explaining an example of a holding method of accumulated information by this block division. Reference numeral 600 denotes a state in which an input image having a size of $X_{img} \times Y_{img}$ pixels is divided into blocks each having $X_{sub} \times Y_{sub}$ pixels, and accumulated image information is generated using an upper left end pixel as an origin for each block. Let $C_{sub(j,k)}$ be accumulated image information of each block, which will be referred to as sub-accumulated information hereinafter, and $C_{sub(j,k)} (X_{sub}, Y_{sub})$ be a value (sub-accumulated information value) at a position $(X_{sub}, Y_{sub})$ when the upper left end pixel of each block is used as an origin (0, 0) (where j is a block position in the horizontal direction, and k is a block position in the vertical direction (both are integer values starting from "0")). Also, $0 \leq x_{sub} < X_{sub}$, and $0 \leq y_{sub} < Y_{sub}$. At this time, a worst case value $C_{max\_sub}$ of each $C_{sub(j,k)} (X_{sub}, Y_{sub})$ is given by:

$$C_{max\_sub} = I_{max} X_{sub} Y_{sub} \quad (5)$$

A bit precision $N_{buf\_sub}$ that can store this value is used as a bit precision required for a buffer which is necessary to store $C_{sub(j,k)}$. Note that $I_{max}$ is a maximum value that can be assumed as an input information value of a bit precision $N_{img}$, that is, $2^{N_{img}} - 1$.

A buffer $R_{sub}$ 602 used to store an accumulated information value $R_{sub(j,k)}$ (to be referred to as a representative accumulated information value 601 hereinafter) calculated for a conventional entire area at a lower right end position of each block $C_{sub(j,k)}$ is separately prepared. That is, in association with equation (1), we have:

$$R_{sub}(j,k) = C(X_{sub}(j+1)-1, Y_{sub}(k+1)-1) \quad (6)$$

In this case, the bit precision of the buffer $R_{sub}$ 602 is $N_{buf\_max}$ since it holds the conventional accumulated information. If we have:

$$J_{max} = (X_{img}-1) \div X_{sub}, K_{max} = (Y_{img}-1) \div Y_{sub} \quad (7)$$

the number of elements of $R_{sub}$ is expressed by $(J_{max}+1)(K_{max}+1)$, since it is equal to the number of blocks. Note that ÷ in these equations represents an integer division, and a remainder is truncated.

Assume that pieces of sub-accumulated information $C_{sub(j,k)}$ of all the blocks and representative accumulated information $R_{sub}$ are held. At this time, in order to restore a conventional accumulated image information value $C(x, y)$ corresponding to a position of a point X shown in FIG. 5B, it does not suffice to add an accumulated information value (sub-accumulated information value) at a pixel 611 to a representative accumulated information value at a position of a pixel 610. That is, sub-accumulated information values at positions of pixels 6121 to 6125 in FIG. 5B must be added. Therefore, let:

$$x_{sub} = \text{mod}(x, X_{sub}), \quad y_{sub} = \text{mod}(y, Y_{sub}),$$

$$j = x \div X_{sub}, \quad k = y \div Y_{sub} \qquad (8)$$

then, making calculations given by:

$$C(x, y) = R_{sub}(j-1, k-1) + C_{sub(j,k)}(x_{sub}, y_{sub}) + \sum_{0 \le k' < k} C_{sub(j,k')}(x_{sub}, Y_{sub}-1) + \sum_{0 \le j' < j} C_{sub(j',k)}(X_{sub}-1, y_{sub}) \qquad (9)$$

the conventional accumulated information value at the desired position X can be reproduced. Note that mod(a, b) is a remainder as a result of an integer division a÷b. Also, $R_{sub}(j-1, k-1)=0$ when j=0 or k=0. After the values of the four points are calculated in this way, calculations given by equation (2) are made as in normal accumulated image information, thus calculating a sum total value of the rectangular area.

For example, for an image having the same conditions as described in the aforementioned paragraphs of the related art, that is, $N_{img}=8$, $X_{img}=640$, and $Y_{img}=480$, $X_{sub}=Y_{sub}=16$. In this case, according to the accumulated information holding method of this embodiment, since $C_{max\_sub}=I_{max}X_{sub}Y_{sub}=6528032$ FF00h, a bit precision is $N_{buf\_sub}=16$ bits. Even when all pieces of accumulated information to be generated are to be temporarily held, a total buffer size to be prepared is $N_{buf\_sub} \times X_{img} \times Y_{img} + N_{buf\_max} \times J_{max} \times K_{max}=4947600$ bits. That is, as can be seen from the above description, compared to the conventional case in which all C(x, y) values are held, the buffer size can be greatly reduced.

However, this buffer size reduction method based on block division suffers the following problems. That is, conventionally, by referring to the values of the four points, a sum total value of a desired rectangular area can be calculated by only making simple additions and subtractions given by equation (2). By contrast, the aforementioned method further requires calculations of equations (7) and (8) respectively for the four points so as to restore a value. That is, the calculation load required to obtain a desired result increases considerably. Especially, implementation of a divider required for calculations given by equations (7) considerably increases the circuit scale at the time of hardware implementation of the processing. Since adders and subtractors used to make the calculations given by equation (2) use the conventional accumulated information value, the bit precision of the buffer is reduced, but the same bit precision $N_{buf\_max}$ as in the conventional method is required to be input. This bit precision also causes an increase in circuit scale, since it is larger than that which is normally required to store a sum total value of a partial area to be calculated. Furthermore, when parallel calculation processing is executed to further increase the processing speed, these increased circuits influence by multiples of parallel degrees, thus posing serious problems, and also influencing operation clocks and the number of pipeline stages. Even when processing is implemented by software, since the processing load corresponding to the restoration calculations increases, the execution speed drops considerably, needless to say.

This embodiment reduces an increase in bit precision and prevents an increase in calculation volume using accumulated information by block division having overlapping areas. This processing will be described below.

(Overlapping Block Division)

FIGS. 6A and 6B show the holding form of accumulated information in this embodiment. Reference numeral 701 denotes an original image as input information, which is the same as that shown in FIG. 4A. Reference numeral 702 denotes a state in which four pieces of divided accumulated information of the input information 701 are generated and held. At this time, the input information 701 is divided into nine areas, as shown in FIG. 6A. Each of blocks e, i, and h has a width equal to that of a processing window 7031 or 7041, and is allocated at the central portion of the input information 701 in the horizontal direction. Each of blocks f, i, g has a height equal to that of the processing window 7031 or 7041, and is allocated at the central portion of the input information 701 in the vertical direction.

The four pieces of divided accumulated information 702 include four blocks 7021, 7022, 7023, and 7024. In this case, the first block 7021 corresponds to accumulated information for an area as a combination of areas a, e, f, and i of the input information 701, and is generated to have an origin position of the input information 701 as a reference location. The second block 7022 corresponds to accumulated information for an area as a combination of areas e, b, i, and g, and has an upper left end element of the area e (an origin position of the area e) as a reference location. Likewise, the third block 7023 corresponds to accumulated information for an area as a combination of areas f, i, c, and h, and the fourth block 7024 corresponds to accumulated information for an area as a combination of areas i, g, h, and d. Note that the third and fourth blocks 7023 and 7024 are generated to respectively have the upper left end of the area f (an origin position of the area f) and that of the area i (an origin position of the area i) as reference locations.

Overlapping areas 705 represent that two or more accumulated information values are generated based on an input information value at an identical position. For example, the overlapping areas 705 between the first and second blocks 7021 and 7022 are generated in correspondence with values of the areas e and i in the input information. Of course, since the first and second blocks 7021 and 7022 have different reference locations, accumulated values themselves to be generated assume different values. The same applies to overlapping areas corresponding to the remaining areas f, h, and g, and these overlapping areas indicate boundary areas used with reference to the identical areas between the two neighboring divided blocks. Especially, overlapping areas corresponding to the area i are included in all the four blocks, and four accumulated information values are generated based on an input information value of the identical area.

Which accumulated information of the four blocks is to be used to make calculations for calculating, for example, a sum total value is determined depending on the position of the processing window in the input information. The processing window 7031 at the scan start position (the origin position of the input information) uses accumulated information 7032 in the first block 7021. A state in which the scan progresses, and the processing window enters a right neighboring pixel position of a position overlapping the area e is indicated as the processing window 7041. The processing window 7041 switches accumulated information to be used to the second block 7022, and uses accumulated information 7042. At the position completely overlapping the area e, the accumulated information of either the first or second block 7021 or 7022 may be used. In this embodiment, assume that the accumulated information of the first block 7021 is used at that position. Likewise, as for the vertical direction, when the processing window enters a position one pixel below a position matching the area f, i, or g, accumulated information to be used is switched to the third or fourth block 7023 or 7024.

That is, only one block of accumulated information is to be used at one time according to the position of the processing window. As described above, the respective blocks hold pieces of accumulated information having different reference locations (=accumulation start points). However, due to the presence of the overlapping areas, only one block refers to four points indicating a rectangular area at one time. Hence, the need for extra calculations such as conversions given by equations (8) and (9) can be obviated, and a sum total value of a desired rectangular area can be obtained by always making calculations given by equation (2).

In this way, at a lower right end position of each block, that is, a position 706 in FIG. 6B, a bit precision at which an accumulated information value is surely prevented from overflowing need only be set as the bit precision $N_{buf}$ of the buffer. That is, in an area corresponding to one block, a bit precision that can prevent an intra-block sum total value for $I_{max}$ when all pixel values of input information assume maximum values need only be calculated. Of course, according to the gist of the present invention, since respective blocks need not have identical sizes, if sizes are different, a bit precision may be determined based on a largest block, or different bit precisions may be determined for respective blocks.

For example, a case will be examined below under the same conditions as exemplified in the description of the related art. That is, an input image of $N_{img}$=8, $X_{img}$=640, and $Y_{img}$=480 is used. In this case, assume that a processing window size (=a maximum rectangular area size that can be assumed) used in the subsequent stage processing is, for example, $X_{rect\_max}$=$Y_{rect\_max}$=16. When this input image is divided into four blocks like in this embodiment, the areas e, i, and h in the information 701 shown in FIG. 6A are located between X-coordinates $X_{img}/2-X_{rect\_max}/2$=312 and $X_{img}/2+X_{rect\_max}/2-1$=327. Also, the areas f, i, and g are located between Y-coordinates $Y_{img}/2-Y_{rect\_max}/2$=232 and $Y_{img}/2+Y_{rect\_max}/2-1$=247. That is, a size (the number of elements) per block is $X_{block} \times Y_{block}$=328×248, and all of the four blocks have the same size (the number of elements) in this example. Therefore, when the input information within this range assumes a maximum value $I_{max}=2^{Nimg}-1$=255, since an accumulated information maximum value is $C_{max\_block}$=$I_{max}X_{block}Y_{block}$=20742720=13C8240h, $N_{buf}$=25 bits. In this manner, the bit precision to be assured of accumulated information is determined based on the bit precisions of respective elements of the input information and the size of the divided area, and is 25 bits in this example. Therefore, when all pieces of generated accumulated information for the entire input image are to be held at one time, a buffer size to be prepared is $N_{buf} \times X_{block} \times Y_{block} \times 4$=8134400 bits. That is, the buffer size can be saved by about 20 kBytes compared to the conventional case in which the accumulated information is held at one time.

Note that the dividing method by the dividing controller 114 is not limited to four divisions described in this embodiment, and the bit precision can be reduced with increasing number of divisions. However, since overlapping areas must be assured between neighboring blocks, a size per block must be larger by one or more pixels than the processing window in all directions of dimension. Also, when the number of divisions is too large, an increase in number of overlapping areas results in an increase in buffer area in place of a reduced bit precision. Hence, a larger number of divisions is not necessarily good. Also, calculations required to judge accumulated information of a block to be used depending on the position of the processing window may become complicated.

Therefore, the accumulated information holding method based on overlapping block division of this embodiment cannot reduce the buffer size unlike the method described above using FIGS. 5A and 5B. However, this problem can be solved by adopting a method of holding only partial accumulated information at one time (using a band buffer or block buffer), as will be described later. But since this embodiment can reduce the bit precision at least compared to the case in which the accumulated values for the entire area are held, and can obviate the need for calculations required to restore an original accumulated value, it is obviously superior to the method described using FIGS. 5A and 5B in terms of the calculation load and circuit scale.

(Another Method of Specifying Overlapping Area: Rectangle Reference)

The aforementioned overlapping areas are specified based on the size of the processing window in the subsequent stage processing. By contrast, when all rectangular regions (those used by weak discriminators) used in the subsequent stage processing are known in advance, a maximum width in each direction of dimension of the rectangular areas may be specified as that of an overlapping area. That is, in FIGS. 6A and 6B, the length of each of the areas e, i, and h in the horizontal direction may be adjusted to the largest width of the rectangular areas in the horizontal direction. Likewise, the length of each of the areas f, i, and g in the vertical direction may be adjusted to the largest height of the rectangular areas. That is, the rectangular areas used by the weak discriminators are set as processing ranges, and each overlapping area is set to have a size in which each of these rectangular areas (processing ranges) can fit. Then, four points which represent a desired rectangular area from the position of the processing window are converted into absolute coordinate values. A block which includes all of the four points of these absolute coordinate values is selected to calculate equation (2), thus obtaining a sum total value of the desired rectangular area.

Normally, a rectangular area is smaller than the processing window since it is included in the processing window. Therefore, when each overlapping area is specified with reference to a maximum rectangular area in this way, each area can have a smaller size, and the buffer size can be further reduced compared to the case in which each overlapping area is specified with reference to the processing window. However, this method is premised on that the rectangular areas to be used are fixedly known. For example, when rectangular areas are likely to be changed after re-learning, this method cannot be used. Note that the aforementioned rectangular areas and processing window 801 are processing units in the subsequent stage processing which executes calculation processing using accumulated information, and in this specification, these areas will be collectively referred to as processing ranges.

Second Embodiment (Implementation Using Band Buffer)

In the first embodiment, input information is divided into two blocks in each of the vertical and horizontal directions, that is, into four overlapping blocks to generate accumulated information, and pieces of accumulated information corresponding to all the areas are held at one time in the accumulated information storage 113. That is, the first embodiment has exemplified the case in which input information of a two-dimensional array is divided in the respective directions of dimension. However, the present invention is not limited to this.

Figure 10A:
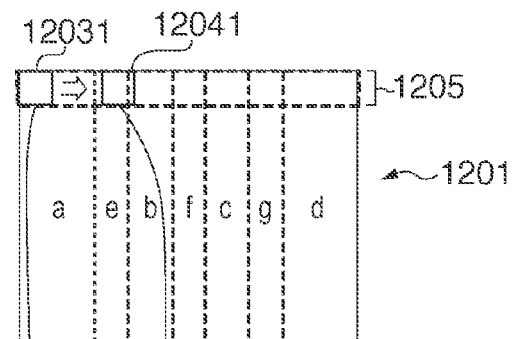
FIGS. 10A and 10B are views showing an example of overlapping divided accumulated information by division in only one direction of dimension with respect to two-dimensional input information.
Figure 10B:
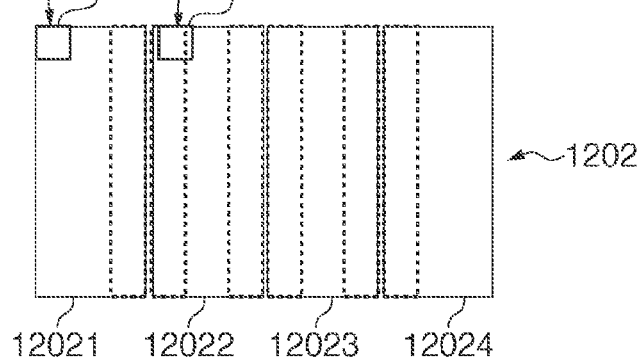

FIGS. 10A and 10B are views for explaining a case in which input information is divided in only the horizontal direction. That is, FIGS. 10A and 10B exemplify a case in which input information of a two-dimensional array is divided in only one direction of dimension. Referring to FIG. 10A, reference numeral 1201 denotes a state in which input information corresponding to that shown in FIG. 4A is divided into seven areas. Of seven areas a, b, c, d, e, f, and g, the three areas e, f, and g are overlapping areas, that is, input information areas shared by two accumulated information blocks having each of these areas as a boundary.

Referring to FIG. 10B, reference numeral 1202 denotes pieces of accumulated information including four blocks 12021, 12022, 12023, and 12024 of the input information 1201. The first block 12021 is accumulated information corresponding to areas a+e, and has an origin of the input information as a reference location. The second block 12022 is accumulated information corresponding to areas e+b+f, and is generated to have an upper left end position (corresponding to an origin of the area e) of the area e as a reference location. Likewise, the third and fourth blocks 12023 and 12024 are pieces of accumulated information respectively corresponding to areas f+c+g and areas g+d, and are generated to respectively have the upper left end positions of the areas f and g as reference locations.

In case of accumulated information obtained by such block division, a block to be used can be switched according to the position of a processing window in subsequent stage processing as in the first embodiment. That is, at a start position indicated by a processing window 12031, a sum total value in a rectangular area within a range 12032 is calculated using accumulated information in the first block 12021. When the scan progresses, and the processing window reaches a right neighboring pixel position of the left end of the area e, accumulated information is switched to use that of the second block 12022. For example, as for a processing window 12041, a sum total value in a rectangular area within a range 12042 is calculated using accumulated information in the second block 12022. After that, pieces of accumulated information of the third and fourth blocks 12023 and 12024 are similarly switched and used based on the positions of the processing window. In this way, as in the first embodiment, a sum total value in a desired rectangular area can be obtained by only simple calculations given by equation (2) without restoring original accumulated information values. Of course, overlapping areas can be determined with reference to the width of a maximum rectangular area to be used in place of the processing window, as in the first embodiment.

In the implementation of the second embodiment, all the four blocks have the same width. That is, if an input image is defined by $N_{img}$=8, $X_{img}$=640, and $Y_{img}$=480, and a processing window is defined by $X_{rect\_max}$=$Y_{rect\_max}$=16 under the same conditions exemplified in the first embodiment, a width $X_{block}$=172. Of course, since the input image is not divided in the vertical direction, a height $Y_{block}$=$Y_{img}$. Therefore, when input information within this range assumes a maximum value $I_{max}$=$2^{Nimg}$−1=255, an accumulated information maximum value is $C_{max\_block}$=$I_{max}X_{block}Y_{block}$= 21052800=1413D80h. That is, a bit precision to be assured is $N_{buf}$=25 bits, which is equal to that of the first embodiment.

Figure 10C:
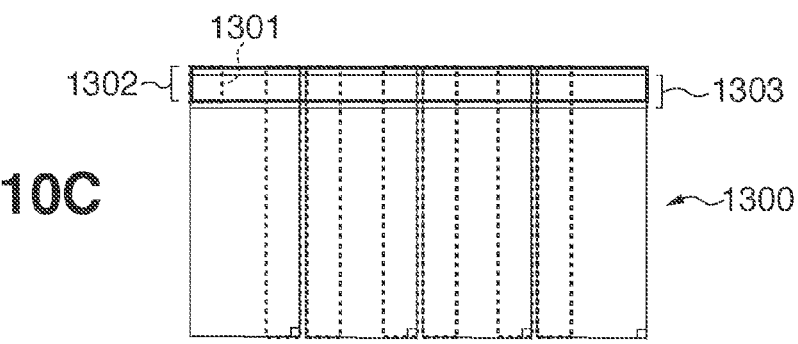
FIG. 10C is a view for explaining holding of overlapping divided accumulated information by division in only the one direction of dimension using a band buffer.

When all these four buffer areas are to be held at one time, a buffer size to be prepared is $N_{buf} \times X_{block} \times Y_{block} \times$ 4=8256000 bits, and the buffer size slightly larger than the first embodiment is required. However, by adopting such division excluding one direction of dimension, the buffer size can be further saved, as will be described below. FIG. 10C is a view showing a method of holding pieces of block-divided accumulated information shown in FIGS. 10A and 10B using a band buffer.

Referring to FIG. 10C, reference numeral 1300 denotes a full area of the accumulated information 1202 shown in FIG. 10B. Reference numeral 1302 denotes a band area to be held at one time. Especially, a position of the band area 1302 is that at the beginning of processing. The subsequent stage processing starts processing from a processing window 1301 at an origin position, and executes the processing while shifting the processing window pixel by pixel to the right. At this time, accumulated information of the band area 1302 held in a band buffer is used. Of course, when the processing window reaches a position corresponding to the processing window 12041 shown in FIG. 10A, accumulated information at a position corresponding to the range 12042 at a right neighboring pixel position of the overlapping area is used, as described above.

Upon completion of scanning of the processing window for one row, a range of accumulated information to be held in the band buffer is shifted one line downward from the band area 1302 to a band area 1303. At this time, the band buffer is used as a ring buffer, discards accumulated information for the oldest line (i.e., one line including the origin), and holds newly calculated accumulated information for one line in this area. As described above, since accumulated information can be generated based on a previous line, accumulated information generated in this line is correctly equal to that of the accumulated information 1202. Likewise, accumulated information for one line is calculated and held every one row is scanned, thus completing generation of accumulated information up to an input image last position and the subsequent stage processing synchronized with the generation processing.

Note that the subsequent stage processing in the second embodiment is equivalent to that in the first embodiment (the processing described using FIGS. 8 and 9). However, processing corresponding to the main processing S1103 is executed for respective band areas.

According to the above arrangement, a height of the band buffer used to hold information at one time can be greater than or equal to that of the processing window. Therefore, by introducing the holding processing of accumulated information using such band buffer, a buffer size to be prepared can be greatly saved. For example, in case of the previous example, since $Y_{block}$=16 need only be set, $N_{buf} \times X_{block} \times Y_{block} \times$ 4=275200 bits, thus greatly reducing the buffer size.

Figure 11:
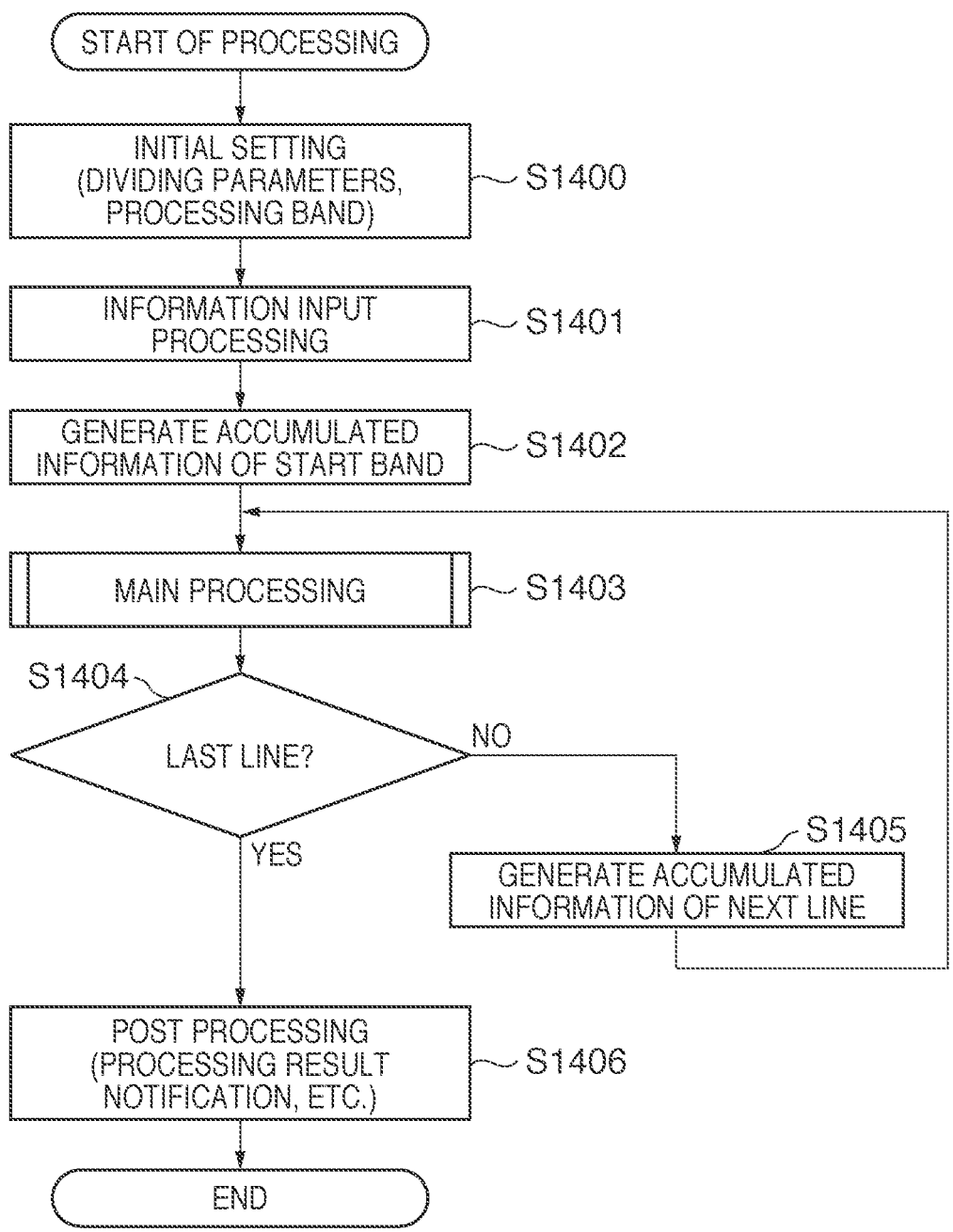
FIG. 11 is a flowchart showing the sequence of overall processing in the information processing apparatus according to the embodiment when overlapping divided accumulated information is held by the band buffer.

FIG. 11 is a flowchart showing the sequence of overall processing when overlapping block-divided accumulated information is held in the band buffer, and corresponds to FIG. 9 in the first embodiment. Step S1400 is initial setting processing. In this step, a CPU 101 sets, in an accumulated information calculation processing unit 100, the same dividing parameters as in the first embodiment, the position of an initial processing band (a start band; a band area 1205 in FIG. 10A), and a first processing window position in the processing band. Step S1401 is information input processing equivalent to step S1101. Note that step S1401 may be executed in synchronism with steps S1402 and S1405 to be described later as in the first embodiment, as another implementation.

Step S1402 is accumulated information generation processing, which includes the following differences from the first embodiment (S1101). That is, the CPU 101 generates only overlapping divided accumulated information corresponding to the position of the first band (band area 1205), and holds the generated information in an accumulated information storage 113. The overlapping divided accumulated information held at this time corresponds to accumulated information of the area 1302 in FIG. 10C. Note that the operations of the CPU 101, a DMAC 103, and the accumulated information calculation processing unit 100 are basically the same as those in the first embodiment, except for a range.

Upon completion of holding of the accumulated information at the position (start band position) indicated by the band area 1205 in the band buffer in the accumulated information storage 113 in step S1402, main processing is executed (S1403). Assume that in the main processing, pattern recognition processing described using FIG. 8 is executed as in the first embodiment. When the processing window is located at the start position of a band in the input information (for example, the processing window 12031), predetermined processing equivalent to that described as steps S1002 to S1008 in FIG. 8 is executed. Next, as processing corresponding to step S1001, the processing window 12031 is moved to a position shifted by one pixel to the right, and the predetermined processing is executed again. After that, until the processing window reaches the right end of the current processing band (processing band 1205), the predetermined processing is repeated as in the first embodiment. That is, in the second embodiment, step S1001 is processing for shifting the processing window pixel by pixel to the right from the left end position of a band, and the end of scanning in step S1007 is processing for detecting the end of processing up to the right end of one band. Of course, as in the description of the first embodiment, a block of accumulated information to be used is switched according to the horizontal position of the processing window.

Upon completion of the main processing S1403 for one band, the CPU 101 discriminates whether or not the currently processed band is located at a position including the last line of the input information (S1404). If the currently processed band is not located at the last line position, the process advances to step S1405 to generate and hold accumulated information for the next line. At this time, since accumulated information for the previous line has already been held on the band buffer of an accumulated information holding memory 1131, accumulated information for one line in each block can be generated in the same manner as in the generation method described in the first embodiment. That is, this calculation does not cause any overhead due to use of the band buffer. After accumulated information for the next line is generated and held in step S1405, the band position of accumulated information is shifted to a position one line below from the band area 1205. In this state, overlapping divided accumulated information in the range 1303 in FIG. 10C is held. Then, the CPU 101 executes the main processing S1403. After that, the CPU 101 similarly repeats the processing while shifting the band downward line by line until the last line is discriminated in step S1404. If it is discriminated in step S1404 that the last line is reached, the CPU 101 executes the same post processing as in step S1104 (S1406), thus completing the processing.

As described above, according to the second embodiment, accumulated information for each divided area is generated for a partial area (band area) which has a full length of input information in a direction of dimension in which division is made, and a predetermined length in a direction of dimension in which division is not made. Upon generation of the accumulated information, every time processing based on the subsequent stage processing is complete for each partial area, the partial area is shifted in the direction of dimension in which division is not made, and accumulated values of elements of the input information, which newly enter the shifted partial area, are additionally calculated. Therefore, according to the second embodiment, no accumulated information is generated twice or more except for accumulated information of each overlapping area. Also, as in the first embodiment, pipeline processing with the input processing of one element of the input information may be executed, and an accumulated information value of an overlapping area corresponding to an identical input information value may be simultaneously generated. That is, use of band holding does not cause any temporal overhead required to generate accumulated information, and a processing time is nearly the same as that in a case in which all pieces of block divided accumulated information are held at one time. Then, the band holding is a method that can further reduce only the buffer size. Also, all the buffer widths need not be the same as in this embodiment, and the buffer may be divided at round addresses of, for example, powers of 2, which allow easy calculations.

The band height can be determined based on a maximum size of a rectangular area used in practice, and the buffer size is likely to be further reduced. In this case, however, the subsequent stage processing must be changed (e.g., to execute filter type unit processing in place of processing window unit processing). Also, overheads may be caused due to the change of the subsequent stage processing.

Third Embodiment

The second embodiment reduces a required buffer size by adopting a band area as a range of accumulated information to be held at one time. The third embodiment further reduces a buffer size by holding only a part of overlapping accumulated information in block buffers. Note that the third embodiment will explain efficient generation and holding methods of accumulated information using double buffer-type block buffers.

Figure 12A:
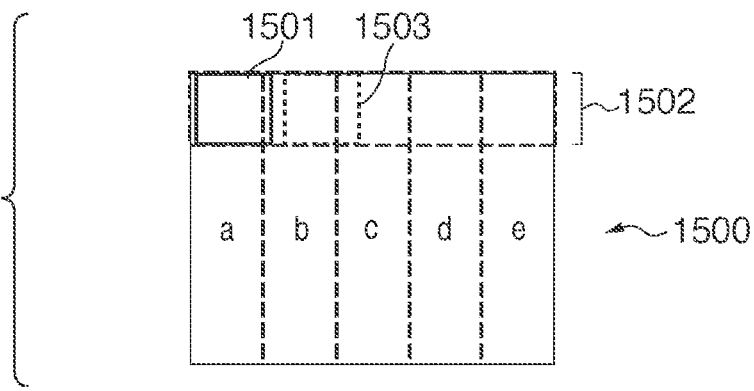
FIGS. 12A, 12B, and 12C are views for explaining an example of holding of overlapping divided accumulated information using double buffer-type block buffers.
Figure 12B:
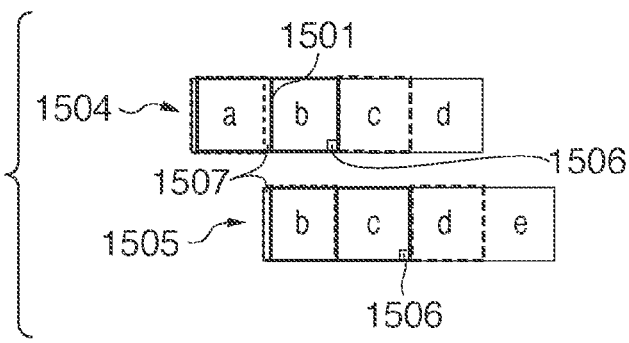
Figure 12C:
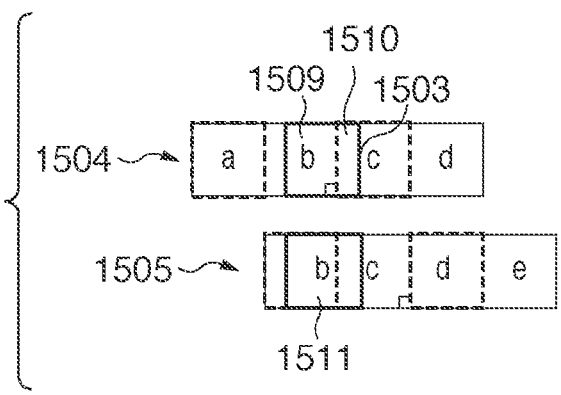

In FIG. 12A, reference numeral 1500 denotes input information corresponding to FIG. 4A. The input information 1500 is divided into areas in the horizontal direction to have a width equal to a processing window 1501. In block division of this embodiment, overlapping areas are continuously allocated to be in contact with each other. That is, accumulated information of a first block is generated in correspondence with pieces of input information of areas a and b, that of a second block is generated in correspondence with areas b and c, that of a third block is generated in correspondence with areas c and d, and that of a fourth block is generated in correspondence with areas d and e. That is, the areas b, c, and d are used as continuous overlapping areas. Note that FIGS. 12A to 12C show the processing window which equally divides the entire area of the input information into five areas, for the sake of simplicity. Alternatively, a smaller processing window may be used to divide the entire area by its width. In FIGS. 12B and 12C, reference numerals 1504 and 1505 denote two block buffers (first and second buffers) used to hold accumulated information according to the third embodiment. These buffers are configured as double buffers. When predetermined calculations using accumulated information are made using one of these buffers, the other buffer is not used, and performs only a holding operation of accumulated information. This will be described in detail later.

Each of the first and second buffers 1504 and 1505 is a ring buffer which has an area having a width for one pixel as a unit, and has the number of elements which matches the processing window, that is, a size $X_{rect\_max} \times Y_{rect\_max}$ (to be described in detail later). The respective buffers temporarily hold, only for the processing window width, accumulated information continuous in an area defined by horizontally juxtaposing two processing windows. For example, accumulated information to be held in the first buffer 1504 is that corresponding to a block of areas a+b or c+d. Also, the second buffer 1505 holds accumulated information corresponding to a block of areas shifted by the processing window width, that is, areas b+c or d+e. That is, a block of accumulated information has a size defined by $X_{block}=2X_{rect\_max}$ and $Y_{block}=Y_{rect\_max}$. More generally speaking, the areas a+b or c+d are those which have a length in the direction of dimension in which division is made twice that in the direction of dimension corresponding to a processing range, and in which an overlapping area has the same size as the processing range. Note that each of the first and second buffers which hold such areas is required to have a size $2X_{rect\_max} \times Y_{rect\_max}$. However, since this embodiment adopts a ring buffer, the buffer size is reduced to $X_{rect\_max} \times Y_{rect\_max}$.

Accumulated information in each block is generated to have an upper left end position of the block as a reference location. Therefore, since its worst case value is expressed by $C_{max\_block}=I_{max}X_{block}Y_{block}=2I_{max}X_{rect\_max}Y_{rect\_max}$, a bit precision that can store $C_{max\_block}$ can be set as a bit precision $N_{buf}$ of the buffer. Note that $C_{max\_block}$ is a maximum value of an accumulated value stored at the position of a pixel 1506 in FIG. 12B. Upon examining under the same conditions as in the aforementioned embodiment, since $C_{max\_block}=$ 130560=1FE00h, a bit precision to be assured for the buffer is $N_{buf}=17$ bits. Since the buffer size to be prepared requires that for double buffers for the processing window, $N_{buf} \times X_{rect\_max} \times Y_{rect\_max} \times 2=8704$ bits. Hence, according to this embodiment, the buffer size can be greatly reduced.

Figure 13:
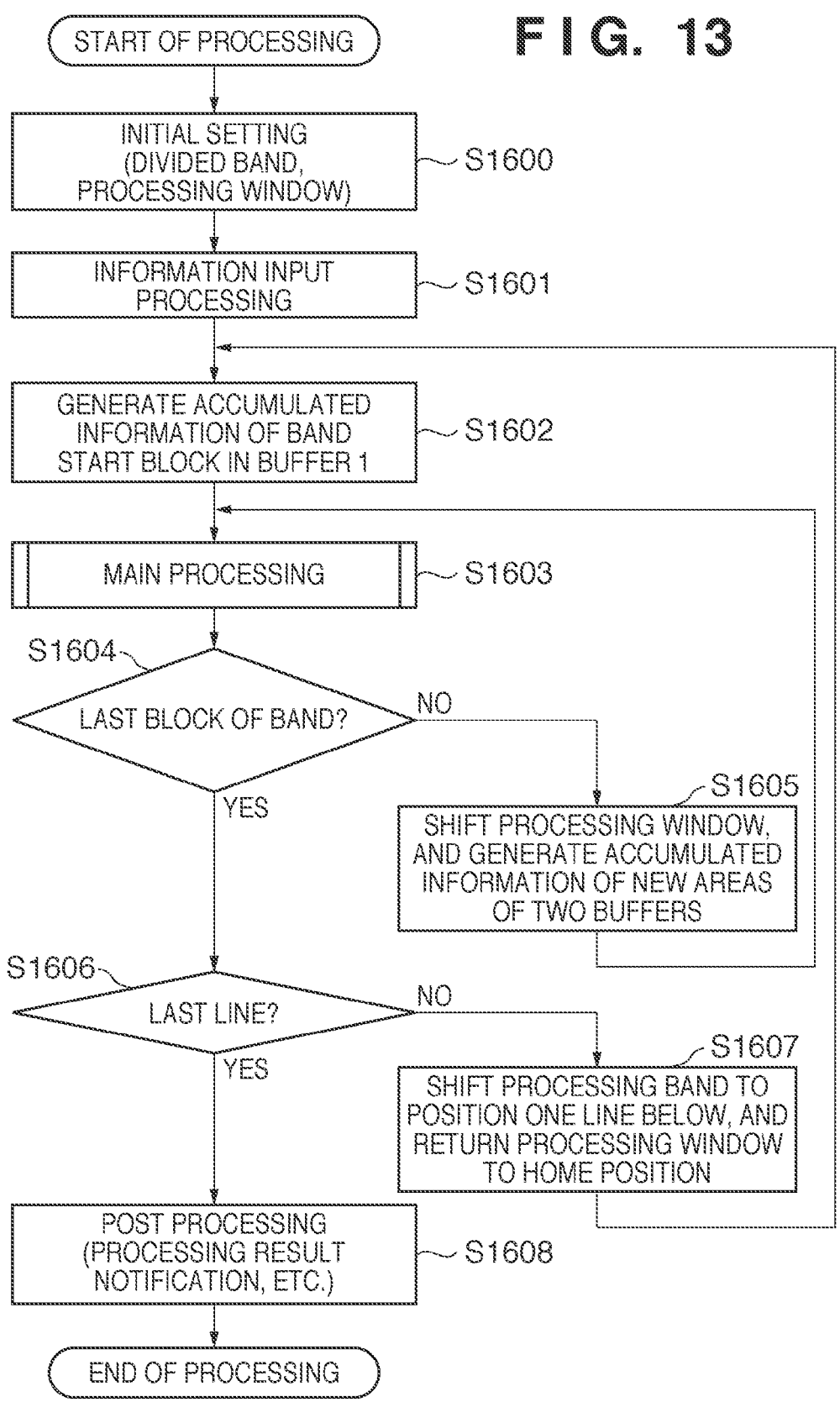
FIG. 13 is a flowchart showing the sequence of overall processing in the information processing apparatus according to the embodiment upon holding the overlapping divided accumulated information by the double buffer-type block buffers.

The sequence of overall processing executed upon holding accumulated information using the double buffer-type block buffers according to the third embodiment will be described below with reference to the flowchart shown in FIG. 13. Note that FIGS. 12A to 12C will also be referred to as needed.

At the beginning of processing, a CPU 101 executes initial setting processing (S1600). This initial setting processing includes processing for setting an uppermost stage including an origin position of the input information, that is, a band area 1502 in FIG. 12A as an area (=processing band) to be processed first, which has an input information width and a processing window height. Also, the initial setting processing includes processing for a left end area of the processing band as a processing window area that executes processing first. Step S1601 is the same information input processing as in step S1101 in FIG. 9. Note that step S1601 may parallelly input only required input information in synchronism with steps S1602 and S1605 (to be described later) unless subsequent stage processing directly uses the input information, as in the first embodiment. Alternatively, step S1601 may input the input information for respective lines in correspondence with a processing band position in synchronism with only step S1602.

In step S1602, the CPU 101 generates and stores accumulated information of the start, that is, left-end processing window area at the current processing band position. That is, the CPU 101 generates accumulated information which matches the area a in FIG. 12B, and holds it in the first buffer 1504.

Then, main processing in step S1603 is executed. This processing is equivalent to that shown in FIG. 8. In this embodiment, since only processing for one processing window is to be executed, the processes in steps S1001 and S1007 are excluded. Of course, accumulated information used when the processing window is located at the start position as the left end is that held in the first buffer 1504. However, as the processing progresses, accumulated information held in the second buffer 1505 may be used according to the position of the processing window. This will be described later.

Upon completion of the main processing for the current processing window, the CPU 101 determines whether or not the position of the processing window is that of the last block of the current processing band (band area 1502), that is, the right end. When the processing window is located at the right end, this means that the processing at the current processing band position is complete. If the processing window is not located at the position of the last block, the CPU 101 shifts the position of the processing window to the right by one pixel (S1605). This position is expressed as that of the processing window 1501 in FIGS. 12A and 12B. At this time, a line segment area 1507 part protruding from the area a becomes a line segment of newly required accumulated information values (an area having a width for one pixel). Accumulated information of this new line segment includes values obtained by adding sums from the uppermost pixel to respective pixels of input information values of the new line segment (accumulated values in the column direction up to respective pixel positions of the line segment) to the left neighboring accumulated information values of respective pixels (accumulated information values at the right end of the area a). This calculation can be easily understood when it is considered that the horizontal direction is changed to the vertical direction upon calculating the accumulated information value for one line by adding an accumulated value up to a pixel position of interest in one line to that in a line immediately above that pixel in the same manner as in the first and second embodiments. That is, values of the new line segment area 1507 to be generated in this case in the first buffer 1504 are equal to accumulated information values continuously generated to have the upper left end position (origin) of the area a as a reference location.

In the third embodiment, each of the first and second buffers 1504 and 1505 has a size equal to the processing window size, and is configured as a ring buffer for respective line segments. Therefore, a physical area for storing accumulated information of the new line segment area 1507 is originally an area which held the leftmost line segment including the origin. After that, every time one line segment is added, accumulated information of the oldest line segment is discarded. The same applies to the second buffer 1505.

In step S1601, simultaneously with generation and holding of the accumulated information of the line segment area 1507 in the first buffer 1504, accumulated information of a line segment area having the same size is also generated and held in the second buffer 1505. This accumulated information is that which is newly generated to have a pixel at the upper left position of the area b as a reference location unlike the accumulated information in the first buffer 1504. That is, upon calculating accumulated values of overlapping areas b, c, and d in step S1605, accumulated values are calculated from different reference locations, and are stored in the first and second buffers 1504 and 1505. For example, for the area b, accumulated values generated to have the upper left position of the area a as a reference location are held in the first buffer 1504, and those generated to have the upper left position of the area b as a reference location are held in the second buffer 1505. For the area c, accumulated values generated to have the upper left position of the area c as a reference location are held in the first buffer 1504, and those generated to have the upper left position of the area b as a reference location are held in the second buffer 1505. Since both the first and second buffers 1504 and 1505 refer to the same input pixel upon generation of accumulated information, these two pieces of accumulated information can be simultaneously generated by commonly referring to an input element value holding register 203 (FIG. 2) of an accumulated information generator 111. Note that when loading of pixels of the input information and accumulated information generation calculations are processed by pipeline processing, generation of two pieces of accumulated information causes nearly no temporal overhead.

Next, the main processing in step S1603 is executed again in association with the shifted processing window. In this way, the processes in steps S1603 to S1605 are repeated up to the last position of the current processing band. In this case, each buffer holds accumulated information continuous in a block of the range defined by juxtaposing two processing windows (e.g., a+b or b+c). In each buffer, when the processing window protrudes from this block, the protruded area extends over the next block, and the buffer is changed to hold accumulated information values to have the upper left position of the next block as a reference location. Therefore, the buffer used in the main processing in step S1603 must be switched between the first and second buffers 1504 and 1505 depending on the position of the processing window.

For example, in case of the processing window 1501, since the first buffer 1504 holds accumulated information continuous in the processing window 1501, as shown in FIG. 12B, the first buffer 1504 is used in the main processing. Assume that when the processing progresses, the processing window is shifted to the right and is moved to the position where it protrudes from the area b to the right like a processing window 1503. At this time, as shown in FIG. 12C, the first buffer 1504 includes both an area 1509 that holds accumulated information values which are continuously calculated to have the upper left end of the area a as a reference location, and an area 1510 that holds accumulated information values which are newly calculated to have the upper left end of the area c as a reference location. However, at this time, the second buffer 1505 holds continuous accumulated information to have the upper left end of the area b as a reference location, as indicated by an area 1511. Therefore, when the processing window extends over both the areas b and c like the processing window 1503, the main processing in step S1603 can use the accumulated information in the second buffer 1505. Likewise, for the processing window which extends over the areas c and d, the first buffer 1504 is used again. Also, for the processing window which extends over the areas d and e, the second buffer 1505 is used. In this way, continuous accumulated information can always be used. Since the accumulated information applied calculations can guarantee an intra-rectangle sum total value of the calculation result irrespective of a reference location as long as values are continuous in the processing window, such holding method can be realized.

Upon completion of processing until the last position in the processing band, the CPU 101 determines whether or not the last line position in the full input information has been processed (S1606). If the position of the processing band has not reached the last line position yet, the CPU 101 controls to shift the processing band position to a position one line below, and to return the processing window position to the start (left end) position of the processing band position (S1607).

Then, the CPU 101 repeats the processing in step S1602 again. At this time, accumulated information of a band start block is generated in step S1602 to have the upper left end of that processing band as a reference location. That is, compared to the previous accumulated information of the identical block, the reference location is shifted to a position one line below. However, as described above, since accumulated information need only be continuous within the processing window when it is used, a change in reference location does not pose any problem. The processing is repeated in turn until it is determined in step S1606 the last line is reached, thus processing the entire area of the input information. Then, post processing equivalent to step S1104 is executed, thus completing the overall processing.

As described above, according to the accumulated information holding method using the double buffer-type block buffers of the third embodiment, a very small buffer size is required. Nearly no overhead is caused in the accumulated information applied calculations, but the bit precision $N_{buf}$ can be reduced, and a circuit scale reduction can be expected exclusively for these calculations. Note that the third embodiment forms divided areas so that overlapping areas continue. However, the present invention is not limited to this. For example, divided areas shown in FIGS. 10A and 10B may be used. In this case, for example, the first buffer may be configured to store accumulated information of areas a+e and f+c+g, and the second buffer may be configured to store accumulated information of areas e+b+f and g+d.

Figure 12D:
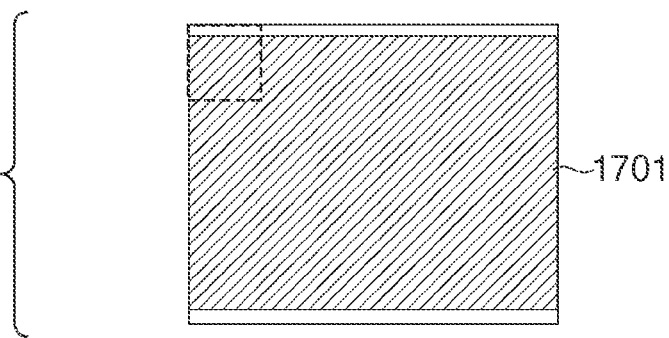
FIG. 12D is a view showing an area that causes calculation overheads upon holding the overlapping divided accumulated information by the block buffers.

However, implementation using the block buffers according to the third embodiment causes overheads upon generation of accumulated information. FIG. 12D shows an area that causes calculation overheads upon generation of accumulated information with respect to the entire area of an input image. Accumulated information corresponding to the first line of the input image is generated only once in correspondence with scanning of the processing window at the initial processing band position. At the position of the second line, pieces of accumulated information having different values are generated twice, that is, when the processing band is located at the initial position and is located at the next position one line below. Likewise, the third and subsequent lines include areas for which accumulated information is generated "maximum processing window height−1" times (for example, three times for the third line and four times for the fourth line). In an area 1701, accumulated information is generated twice or more. When the arrangement using the block buffers according to this embodiment is adopted, these calculation overheads are generated. Hence, whether or not to select this embodiment can be judged depending on a tradeoff with the buffer size reduction.

Other Embodiments

Application of the present invention is not limited to the aforementioned embodiments. For each area obtained by overlapping block division, as shown in FIG. 6B or as denoted by reference numeral 1202 in FIG. 10B, an embodiment for generating and holding only accumulated information corresponding to one block at one time may be adopted. Furthermore, for this one block, a generation & holding method using a band buffer or block buffers may be adopted.

Accumulated information can also be generated for multi-dimensional array information of three or more dimensions. FIGS. 14A and 14B are views showing an example of a state of accumulated information in case of three dimensions. Input information of a three-dimensional array is, for example, movie information, and is three-dimensional information since one dimension of a time axis is added to a two-dimensional image. In FIG. 14A, an element at a position of a point X in a three-dimensional accumulated information array holds a sum total value of elements included in a rectangular parallelepiped having an origin and the point X in the input three-dimensional information as diagonal points. Using this three-dimensional accumulated information, a sum total value of elements in, for example, a rectangular parallelepiped 1801 in FIG. 14B can be calculated. Let $(x_0, y_0, t_0)$ and $(x_1, y_1, t_1)$ be coordinates of two points which indicate diagonal points of the rectangular parallelepiped 1801. Letting A, B, C, D, E, F, G, and H be accumulated information values at positions:

$$A: (x_0-1, y_0-1, t_0-1),$$

$$B: (x_1, y_0-1, t_0-1),$$

$$C: (x_0-1, y_1, t_0-1),$$

$$D: (x_1, y_1, t_0-1), \quad (10)$$

$$E: (x_0-1, y_0-1, t_1),$$

$$F: (x_1, y_0-1, t_1),$$

$$G: (x_0-1, y_1, t_1),$$

$$H: (x_1, y_1, t_1)$$

a sum total value $S_{3d}$ of elements in the rectangular parallelepiped 1801 of the input information can be calculated by:

$$S_{3d} = H - D - F + B - (G - C - E + A) \quad (11)$$

Figure 15:
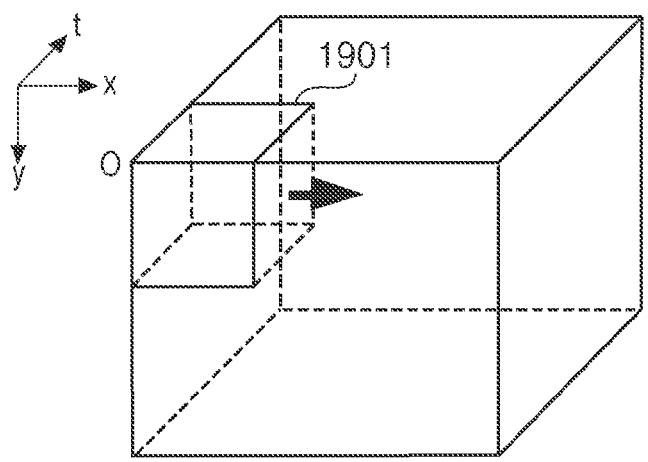
FIG. 15 is a view for explaining a scan operation of the three-dimensional accumulated information by a processing window.

In this three-dimensional accumulated information, a processing window of a rectangular parallelepiped is used as a subsequent stage processing unit. In FIG. 15, reference numeral 1901 denotes an example of a processing window in case of three-dimensional input information. By scanning this processing window in turn in an x-axis direction, y-axis direction, and t-axis direction, processing for the entire area of the three-dimensional input information is executed.

Figure 16:
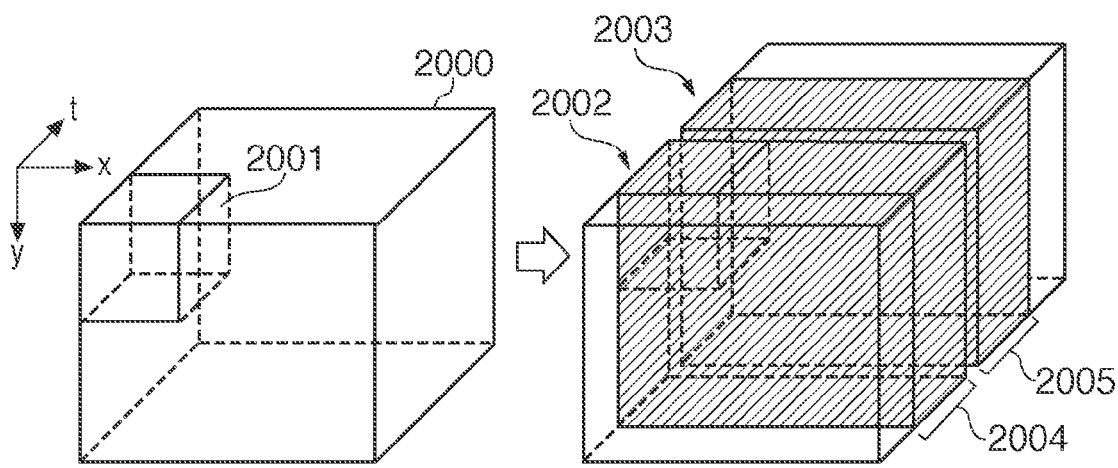
FIG. 16 is a view showing an example of a form of buffers used to hold the three-dimensional accumulated information.

As is apparent from the above description, the present invention can also be applied to such three-dimensional input information. For example, pieces of accumulated information can be held based on overlapping block division shown in FIG. 16. Referring to FIG. 16, when input information 2000 and a processing window 2001 as a subsequent stage processing unit are available, accumulated information is held in two buffers 2002 and 2003. These buffers have overlapping areas 2004 and 2005, and original input information values required to generate accumulated information of these two overlapping areas are referred to from an identical area.

Of course, this example is merely an example of division in only the t-axis direction. As in two-dimensional information, information may be divided in another axis direction or in a plurality of axis directions or all axis directions. At this time, in case of block division which does not make division in at least one direction of dimension, the band buffer described in the second embodiment can be applied. Upon execution of block division which does not make division in one axis direction but makes division in other directions, the holding method using the double buffer-type block buffers having a processing window size described in the third embodiment can be applied. In either case, since continuous accumulated information values can be held in the processing window, at least accumulated information applied calculations cause nearly no calculation overhead. However, depending on division and holding methods, overheads for accumulated information generation calculations are generated as in the two-dimensional information. As described above, the present invention can be applied even to accumulated information for multidimensional input information of three or more dimensions if it is similarly considered as a hyper-rectangular parallelepiped.

The present invention can be applied not only to a hardware circuit but also to software processing. According to a size of a divided area, a smaller buffer may be used although a 32-bit long-type array is required to be used in case of non-division.

Alternatively, even when a non-round bit precision is required, memory use efficiency can be improved using, for example, a bit field function of C in consideration of a tradeoff with a memory access time.

In the descriptions of the above embodiments, the band buffer or block buffer is used as a ring buffer. However, the present invention is not limited to such specific memory use method. For example, the present invention may be applied to a method which prepares a memory address table corresponding to a ring counter, and executes processing while assigning discontinuous areas for a predetermined processing unit with reference to the table. That is, the ring buffer described in the present invention is not limited to a narrowly-defined ring buffer or circular buffer.

The subsequent stage processing described as the main processing in the above embodiments is not limited to pattern recognition processing. The present invention can be applied to processing which uses accumulated information and can limit a size of a maximum area which is likely to be used even in processing of another field such as computer graphics described in the related art.

The present invention can also implement the processing equivalent to the first to third embodiments using computer programs. In this case, respective components shown in FIG. 1 and the like can function using functions or subroutines executed by a CPU. Normally, computer programs are stored in a computer-readable storage medium such as a CD-ROM, and are ready to be executed when the computer-readable storage medium is set in a reader (e.g., a CD-ROM drive) included in a computer to copy or install the programs in a system. Therefore, such computer-readable storage medium is included in the scope of the present invention.

As described above, according to the present invention, the size of a buffer required to hold accumulated information for processing that calculates a sum total value of elements in a specific area of input information as a multidimensional array of two or more dimensions can be reduced. Also, a hardware apparatus for the high-speed processing, which can reduce the processing load on accumulated information applied calculations and can reduce a circuit scale can be implemented. Even in an apparatus using software that executes the processing, a buffer size can be reduced.

As described above, according to the present invention, the size of a buffer required to hold accumulated information can be reduced without increasing a circuit scale and processing load required for calculations.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable holding medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-206453, filed Sep. 7, 2009, which is hereby incorporated by reference herein in its entirety.

What is claimed is:

1. An information processing method comprising:
    a dividing step of dividing input information of a multidimensional array into a plurality of divided areas;
    a generating step of generating, for each divided area of the plurality of divided areas, accumulated information by calculating accumulated values at respective element positions in the divided area from a reference position for the divided area;
    a holding step of holding the accumulated information for each divided area generated in the generating step in a memory; and
    a calculating step of executing calculation using the accumulated information for a processing range of a predetermined size,
    wherein in the dividing step, the input information is divided into the plurality of divided areas such that two neighboring divided areas have an overlapping area, and pixels comprising the overlapping area are shared with the processing range, and
    wherein in the calculating step, the processing range is successively moved to a plurality of locations in the input information, and all accumulated values required at a location in the processing range are calculated from accumulated information generated for a single divided area which contains the location in the processing range.

2. The method according to claim 1, wherein a storage size of the accumulated information assured in the memory is determined based on a bit precision of each element of the input information and a size of each divided area.

3. The method according to claim 1, wherein in the dividing step, division is not performed in at least one direction of dimension of a plurality of dimensions of the input information.

4. The method according to claim 3, wherein in the generating step, a reference location is set to generate accumulated information for each part included in a partial area, which has a length of the divided area in a direction of dimension in which the division is performed in the dividing step and a predetermined length in a direction of dimension in which the division is not performed in the dividing step, of the plurality of divided areas, and
    in the holding step, accumulated information of the partial area is held.

5. The method according to claim 1, wherein in the generating step, accumulated information of a part included in a partial area, which has a full length of the input information in a direction of dimension in which division is performed in the dividing step and a predetermined length in a direction of dimension in which the division is not performed in the dividing step, of the plurality of divided areas is generated in turn in synchronism with calculation in the calculating step, and
    in the holding step, accumulated information of the partial area is held.

6. The method according to claim 5, wherein in the generating step, every time calculation in the calculating step for the partial area ends, the partial area is shifted in the direction of dimension in which the division is not performed, and accumulated information in the shifted partial area is generated by additionally calculating accumulated values for elements of the input information, which newly enter the shifted partial area.

7. The method according to claim 6, wherein in the holding step, pieces of accumulated information obtained for two neighboring partial areas are respectively held in a first buffer and a second buffer, and
    in the generating step, pieces of accumulated information respectively corresponding to the two neighboring partial areas are generated in an overlapping area configured by the two neighboring partial areas, and are held in the first buffer and the second buffer.

8. The method according to claim 6, wherein in the calculating step, predetermined calculation is repeated while shifting the processing range in the direction of dimension in which the division is performed, and
    in the generating step, for elements of the input information which newly enter the shifted processing range every time the processing range is shifted, accumulated values of the elements in a partial area to which the elements belong are calculated.

9. The method according to claim 8, wherein the predetermined length of the partial area is equal to a length of the processing range in a corresponding direction of dimension, the length of the partial area in the direction of dimension in which the division is performed in the dividing step is twice the length of the processing range in the corresponding direction of dimension, and the overlapping area has a size equal to the processing range, and
    in the generating step, when the processing range is shifted in the direction of dimension in which the division is performed, accumulated values of elements of the input information, which newly enter the shifted processing range are additionally generated.

10. The method according to claim 6, wherein in the holding step, when an area for holding the accumulated values is full and additionally calculated accumulated information is to be stored, oldest accumulated information for an amount of the additionally calculated accumulated information is discarded, and the additionally calculated accumulated information is held in that area.

11. The method according to claim 5, wherein a storage size of the accumulated information assured in the memory is determined based on a bit precision of the element and a size of the partial area.

12. The method according to claim 1, wherein the input information is information of a two-dimensional array, and a sum total value of all elements of the input information, which correspond to an interior of a rectangular area having a reference location of each divided area and each element position of the divided area as diagonal points is calculated as an accumulated value corresponding to that element position of the divided area.

13. The method according to claim 1, wherein the input information is information of a multidimensional array of not less than three dimensions, and a sum total value of all elements of the input information, which correspond to an interior of an area of a hyper-rectangular parallelepiped having a reference location of each divided area and each element position of the divided area as diagonal points is calculated as an accumulated value corresponding to that element position of the divided area.

14. An information processing apparatus comprising at least one processor functioning as:
    a dividing unit configured to divide input information of a multidimensional array into a plurality of divided areas;
    a generating unit configured to generate, for each divided area of the plurality of divided areas, accumulated information by calculating accumulated values at respective element positions in the divided area from a reference position for divided area;
    a holding unit configured to hold the accumulated information for each divided area generated by the generating unit in a memory for each divided area; and a calculating unit configured to execute calculation using the accumulated information for a processing range of a predetermined size, wherein the dividing unit divides the input information into the plurality of divided areas such that two neighboring divided areas have an overlapping area, and pixels comprising the overlapping area are shared with the processing range, and wherein the calculating unit executes calculation such that the processing range is successively moved to a plurality of locations in the input information, and all accumulated values required at a location in the processing range are calculated from accumulated information generated for a single divided area which contains the location in the processing range.

15. A non-transitory computer-readable storage medium storing a program for controlling a computer to execute respective steps of an information processing method according to claim 1.

16. An information processing method comprising:
an inputting step of inputting an image;
a setting step of setting a plurality of areas by dividing the image, wherein each set area has a size to include a whole target area;
a generating step of generating, for each set area, accumulated information by accumulating pixel values at respective pixel positions in the set area from each reference pixel position for each set area; and
a calculating step calculating a sum of pixel values in a target area in the set area using the generated accumulated information,
wherein in the setting step, the image is set into the plurality of areas so that two neighboring set areas have an overlapping area, and a size of overlapping area is equal to or greater than a size of the target area such that the target area can be placed in the overlapping area without protruding from the overlapping area.

17. The method according to claim 16, wherein the generating step generates, as the accumulated information, a sum total value of all pixel values included in a rectangle which has a reference pixel position for the set area and each of the pixel positions in the set area.

18. The method according to claim 16, wherein the target area shifts in a horizontal direction or in a vertical direction in the image each time a process in the calculating step is completed.

19. An information processing apparatus comprising:
an inputting unit configured to input an image;
a setting unit configured to set a plurality of areas by dividing the image, wherein each set area has a size to include a whole target area;
a generating unit configured to generate, for each set area, accumulated information by accumulating pixel values at respective pixel positions in the set area from each reference pixel position for each set area; and
a calculating unit configured to calculate a sum of pixel values in a target area in the set area using the generated accumulated information,
wherein the setting unit sets the image into the plurality of areas so that two neighboring set areas have an overlapping area, and a size of overlapping area is equal to or greater than a size of the target area, such that the target area can be placed in the overlapping area without protruding from the overlapping area.

20. The apparatus according to claim 19, wherein the generating unit generates, as the accumulated information, a sum total value of all pixel values included in a rectangle which has a reference pixel position for the set area and each of the pixel positions in the set area.

21. The apparatus according to claim 19, wherein the target area shifts in a horizontal direction or in a vertical direction in the image each time a process executed by the calculating unit is completed.

22. A non-transitory computer readable storage medium storing a program for controlling a computer to execute the information processing method according to claim 16.

* * * * *